United States Patent
Hays

(10) Patent No.: US 8,949,901 B2
(45) Date of Patent: Feb. 3, 2015

(54) METHODS AND SYSTEMS FOR CUSTOMIZING VIEWING ENVIRONMENT PREFERENCES IN A VIEWING ENVIRONMENT CONTROL APPLICATION

(75) Inventor: Zachary Hays, San Francisco, CA (US)

(73) Assignee: Rovi Guides, Inc., Santa Clara, CA (US)

( * ) Notice: Subject to any disclaimer, the term of this patent is extended or adjusted under 35 U.S.C. 154(b) by 212 days.

(21) Appl. No.: 13/172,533

(22) Filed: Jun. 29, 2011

(65) Prior Publication Data

US 2013/0007809 A1 Jan. 3, 2013

(51) Int. Cl.
H04N 5/445 (2011.01)
H04N 21/41 (2011.01)
H04N 21/45 (2011.01)
H04N 21/482 (2011.01)
H04N 21/81 (2011.01)

(52) U.S. Cl.
CPC ....... *H04N 21/4131* (2013.01); *H04N 21/4532* (2013.01); *H04N 21/482* (2013.01); *H04N 21/8173* (2013.01)
USPC ................................ 725/46; 725/47; 709/219

(58) Field of Classification Search
USPC .............................. 725/37–118; 709/217–232
See application file for complete search history.

(56) References Cited

U.S. PATENT DOCUMENTS

| 4,355,415 A | 10/1982 | George et al. |
| 4,429,385 A | 1/1984 | Cichelli et al. |
| 4,573,072 A | 2/1986 | Freeman |
| 4,602,279 A | 7/1986 | Freeman |
| 4,605,964 A | 8/1986 | Chard |
| 4,625,080 A | 11/1986 | Scott |
| 4,635,109 A | 1/1987 | Comeau |
| 4,694,490 A | 9/1987 | Harvey et al. |
| 4,704,725 A | 11/1987 | Harvey et al. |
| 4,706,121 A | 11/1987 | Young |
| 4,718,107 A | 1/1988 | Hayes |
| 4,750,213 A | 6/1988 | Novak |

(Continued)

FOREIGN PATENT DOCUMENTS

| CN | 1129879 | 8/1996 |
| CN | 1164162 | 11/1997 |

(Continued)

OTHER PUBLICATIONS

U.S. Appl. No. 09/332,244, filed Jun. 11, 1999, Lonsberry.

(Continued)

*Primary Examiner* — Annan Shang
(74) *Attorney, Agent, or Firm* — Ropes & Gray LLP

(57) ABSTRACT

Systems and methods for customizing viewing environment preferences using an interactive media guidance application are provided. A media content may be accessed using an interactive media guidance application. A viewing environment preference may be configured and stored that defines attributes of components in the viewing environment. Media content can be associated to a viewing environment preference based on media guidance data. When a media content is accessed, a determination is made whether the accessed media content is associated to a previously stored viewing environment preference. If the accessed media content is associated to a previously stored viewing environment preference, data may be transmitted to a component external to a user equipment device to modify an attribute of the external component based on the previously stored viewing environment preference.

20 Claims, 12 Drawing Sheets

(56) References Cited

U.S. PATENT DOCUMENTS

| | | |
|---|---|---|
| 4,751,578 A | 6/1988 | Reiter |
| 4,761,684 A | 8/1988 | Clark et al. |
| 4,787,063 A | 11/1988 | Muguet |
| 4,814,883 A | 3/1989 | Perine et al. |
| 4,847,698 A | 7/1989 | Freeman |
| 4,847,699 A | 7/1989 | Freeman |
| 4,847,700 A | 7/1989 | Freeman |
| 4,857,999 A | 8/1989 | Welsh |
| 4,864,429 A | 9/1989 | Eigeldinger et al. |
| 4,908,707 A | 3/1990 | Kinghorn |
| 4,930,158 A | 5/1990 | Vogel |
| 4,945,563 A | 7/1990 | Horton et al. |
| 4,959,720 A | 9/1990 | Duffield et al. |
| 4,965,825 A | 10/1990 | Harvey et al. |
| 4,977,455 A | 12/1990 | Young |
| 5,036,314 A | 7/1991 | Barillari et al. |
| 5,038,211 A | 8/1991 | Hallenbeck |
| 5,047,867 A | 9/1991 | Strubbe et al. |
| 5,089,885 A | 2/1992 | Clark |
| 5,093,921 A | 3/1992 | Bevins, Jr. |
| 5,099,319 A | 3/1992 | Esch et al. |
| 5,109,279 A | 4/1992 | Ando |
| 5,109,414 A | 4/1992 | Harvey et al. |
| 5,113,259 A | 5/1992 | Romesburg et al. |
| 5,132,992 A | 7/1992 | Yurt et al. |
| 5,134,719 A | 7/1992 | Mankovitz |
| 5,151,789 A | 9/1992 | Young |
| 5,155,591 A | 10/1992 | Wachob |
| 5,162,905 A | 11/1992 | Itoh et al. |
| 5,172,413 A | 12/1992 | Bradley et al. |
| 5,200,822 A | 4/1993 | Bronfin et al. |
| 5,210,611 A | 5/1993 | Yee et al. |
| 5,216,515 A | 6/1993 | Steele et al. |
| 5,223,924 A | 6/1993 | Strubbe et al. |
| RE34,340 E | 8/1993 | Freeman |
| 5,233,423 A | 8/1993 | Jernigan et al. |
| 5,233,654 A | 8/1993 | Harvey et al. |
| 5,241,428 A | 8/1993 | Goldwasser et al. |
| 5,253,066 A | 10/1993 | Vogel |
| 5,283,639 A | 2/1994 | Esch et al. |
| 5,323,234 A | 6/1994 | Kawasaki |
| 5,335,277 A | 8/1994 | Harvey et al. |
| 5,353,121 A | 10/1994 | Young et al. |
| 5,357,276 A | 10/1994 | Banker et al. |
| 5,359,367 A | 10/1994 | Stockill |
| 5,371,551 A | 12/1994 | Logan et al. |
| 5,382,983 A | 1/1995 | Kwoh et al. |
| 5,410,326 A | 4/1995 | Goldstein |
| 5,410,344 A | 4/1995 | Graves et al. |
| 5,412,720 A | 5/1995 | Hoarty |
| 5,414,756 A | 5/1995 | Levine |
| 5,416,508 A | 5/1995 | Sakuma et al. |
| 5,424,770 A | 6/1995 | Schmelzer et al. |
| 5,438,423 A | 8/1995 | Lynch et al. |
| 5,442,389 A | 8/1995 | Blahut et al. |
| 5,446,488 A | 8/1995 | Vogel |
| 5,446,919 A | 8/1995 | Wilkins |
| 5,449,522 A | 9/1995 | Hill |
| 5,455,570 A | 10/1995 | Cook et al. |
| 5,459,522 A | 10/1995 | Pint |
| 5,461,415 A | 10/1995 | Wolf et al. |
| 5,465,113 A | 11/1995 | Gilboy |
| 5,469,206 A | 11/1995 | Strubbe et al. |
| 5,479,266 A | 12/1995 | Young et al. |
| 5,479,268 A | 12/1995 | Young et al. |
| 5,481,296 A | 1/1996 | Cragun et al. |
| 5,483,278 A | 1/1996 | Strubbe et al. |
| 5,485,197 A | 1/1996 | Hoarty |
| 5,485,219 A | 1/1996 | Woo et al. |
| 5,502,504 A | 3/1996 | Marshall et al. |
| 5,509,908 A | 4/1996 | Hillstead et al. |
| 5,515,098 A | 5/1996 | Carles |
| 5,517,257 A | 5/1996 | Dunn et al. |
| 5,523,794 A | 6/1996 | Mankovitz et al. |
| 5,523,796 A | 6/1996 | Marshall et al. |
| 5,524,195 A | 6/1996 | Clanton, III et al. |
| 5,526,034 A | 6/1996 | Hoarty et al. |
| 5,526,035 A | 6/1996 | Lappington et al. |
| 5,528,304 A | 6/1996 | Cherrick et al. |
| 5,532,735 A | 7/1996 | Blahut et al. |
| 5,534,911 A | 7/1996 | Levitan |
| 5,537,141 A | 7/1996 | Harper et al. |
| 5,539,449 A | 7/1996 | Blahut et al. |
| 5,539,822 A | 7/1996 | Lett |
| 5,543,929 A | 8/1996 | Mankovitz et al. |
| 5,546,488 A | 8/1996 | Kitamura et al. |
| 5,550,576 A | 8/1996 | Klosterman |
| 5,559,548 A | 9/1996 | Davis et al. |
| 5,559,549 A | 9/1996 | Hendricks et al. |
| 5,559,550 A | 9/1996 | Mankovitz |
| 5,561,516 A | 10/1996 | Noble et al. |
| 5,568,272 A | 10/1996 | Levine |
| 5,570,295 A | 10/1996 | Isenberg et al. |
| 5,572,442 A | 11/1996 | Schulhof et al. |
| 5,579,239 A | 11/1996 | Freeman et al. |
| 5,582,364 A | 12/1996 | Trulin et al. |
| 5,583,560 A | 12/1996 | Florin et al. |
| 5,583,561 A | 12/1996 | Baker et al. |
| 5,583,563 A | 12/1996 | Wanderscheid et al. |
| 5,585,838 A | 12/1996 | Lawler et al. |
| 5,585,858 A | 12/1996 | Harper et al. |
| 5,585,865 A | 12/1996 | Amano et al. |
| 5,585,866 A | 12/1996 | Miller et al. |
| 5,589,892 A | 12/1996 | Knee et al. |
| 5,592,551 A | 1/1997 | Lett et al. |
| 5,594,509 A | 1/1997 | Florin et al. |
| 5,596,373 A | 1/1997 | White et al. |
| 5,600,364 A | 2/1997 | Hendricks et al. |
| 5,600,366 A | 2/1997 | Schulman |
| 5,600,573 A | 2/1997 | Hendricks et al. |
| 5,602,582 A | 2/1997 | Wanderscheid et al. |
| 5,606,374 A | 2/1997 | Bertram |
| 5,610,653 A | 3/1997 | Abecassis |
| 5,617,526 A | 4/1997 | Oran et al. |
| 5,619,247 A | 4/1997 | Russo |
| 5,619,249 A | 4/1997 | Billock et al. |
| 5,619,274 A | 4/1997 | Roop et al. |
| 5,621,456 A | 4/1997 | Florin et al. |
| 5,623,613 A | 4/1997 | Rowe et al. |
| 5,629,732 A | 5/1997 | Moskowitz et al. |
| 5,629,733 A | 5/1997 | Youman et al. |
| 5,630,119 A | 5/1997 | Aristides et al. |
| 5,631,995 A | 5/1997 | Weissensteiner et al. |
| 5,632,007 A | 5/1997 | Freeman |
| 5,635,978 A | 6/1997 | Alten et al. |
| 5,635,979 A | 6/1997 | Kostreski et al. |
| 5,640,484 A | 6/1997 | Mankovitz |
| 5,648,824 A | 7/1997 | Dunn et al. |
| 5,650,831 A | 7/1997 | Farwell |
| 5,652,615 A | 7/1997 | Bryant et al. |
| 5,654,748 A | 8/1997 | Matthews et al. |
| 5,654,886 A | 8/1997 | Zereski, Jr. et al. |
| 5,657,072 A | 8/1997 | Aristides et al. |
| 5,657,414 A | 8/1997 | Lett et al. |
| 5,659,350 A | 8/1997 | Hendricks et al. |
| 5,661,516 A | 8/1997 | Carles |
| 5,663,757 A | 9/1997 | Morales |
| 5,666,293 A | 9/1997 | Metz et al. |
| 5,666,645 A | 9/1997 | Thomas et al. |
| 5,675,390 A | 10/1997 | Schindler et al. |
| 5,682,195 A | 10/1997 | Hendricks et al. |
| 5,682,196 A | 10/1997 | Freeman |
| 5,682,206 A | 10/1997 | Wehmeyer et al. |
| 5,684,525 A | 11/1997 | Klosterman |
| 5,689,648 A | 11/1997 | Diaz et al. |
| 5,692,214 A | 11/1997 | Levine |
| 5,694,163 A | 12/1997 | Harrison |
| 5,694,381 A | 12/1997 | Sako et al. |
| 5,696,905 A | 12/1997 | Reimer et al. |
| 5,699,107 A | 12/1997 | Lawler et al. |
| 5,701,383 A | 12/1997 | Russo et al. |
| 5,708,478 A | 1/1998 | Tognazzini |
| 5,710,601 A | 1/1998 | Marshall et al. |
| 5,710,815 A | 1/1998 | Ming et al. |

(56) References Cited

U.S. PATENT DOCUMENTS

| | | |
|---|---|---|
| 5,717,452 A | 2/1998 | Janin et al. |
| 5,721,827 A | 2/1998 | Logan et al. |
| 5,721,829 A | 2/1998 | Dunn et al. |
| 5,724,091 A | 3/1998 | Freeman et al. |
| 5,729,280 A | 3/1998 | Inoue et al. |
| 5,734,853 A | 3/1998 | Hendricks et al. |
| 5,734,893 A | 3/1998 | Li et al. |
| 5,740,549 A | 4/1998 | Reilly et al. |
| 5,745,710 A | 4/1998 | Clanton, III et al. |
| 5,748,191 A | 5/1998 | Rozak et al. |
| 5,748,716 A | 5/1998 | Levine |
| 5,751,282 A | 5/1998 | Girard et al. |
| 5,751,335 A | 5/1998 | Shintani |
| 5,752,159 A | 5/1998 | Faust et al. |
| 5,754,771 A | 5/1998 | Epperson et al. |
| 5,757,417 A | 5/1998 | Aras et al. |
| 5,758,257 A | 5/1998 | Herz et al. |
| 5,758,259 A | 5/1998 | Lawler |
| 5,760,821 A | 6/1998 | Ellis et al. |
| 5,761,601 A | 6/1998 | Nemirofsky et al. |
| 5,761,606 A | 6/1998 | Wolzien |
| 5,768,528 A | 6/1998 | Stumm |
| 5,774,170 A | 6/1998 | Hite et al. |
| 5,774,186 A | 6/1998 | Brodsky et al. |
| 5,774,534 A | 6/1998 | Mayer |
| 5,774,664 A | 6/1998 | Hidary et al. |
| 5,774,666 A | 6/1998 | Portuesi |
| 5,778,181 A | 7/1998 | Hidary et al. |
| 5,778,182 A | 7/1998 | Cathey et al. |
| 5,781,226 A | 7/1998 | Sheehan |
| 5,781,228 A | 7/1998 | Sposato |
| 5,781,246 A | 7/1998 | Alten et al. |
| 5,787,259 A | 7/1998 | Haroun et al. |
| 5,788,507 A | 8/1998 | Redford et al. |
| 5,790,202 A | 8/1998 | Kummer et al. |
| 5,793,964 A | 8/1998 | Rogers et al. |
| 5,796,952 A | 8/1998 | Davis et al. |
| 5,798,785 A | 8/1998 | Hendricks et al. |
| 5,802,284 A | 9/1998 | Karlton et al. |
| 5,805,154 A | 9/1998 | Brown |
| 5,805,763 A | 9/1998 | Lawler et al. |
| 5,805,804 A | 9/1998 | Laursen et al. |
| 5,805,974 A | 9/1998 | Hite et al. |
| 5,808,608 A | 9/1998 | Young et al. |
| 5,812,123 A | 9/1998 | Rowe et al. |
| 5,812,931 A | 9/1998 | Yuen |
| 5,815,671 A | 9/1998 | Morrison |
| 5,818,438 A | 10/1998 | Howe et al. |
| 5,818,439 A | 10/1998 | Nagasaka et al. |
| 5,818,935 A | 10/1998 | Maa |
| 5,819,019 A | 10/1998 | Nelson |
| 5,826,168 A | 10/1998 | Inoue et al. |
| 5,828,370 A | 10/1998 | Moeller et al. |
| 5,828,420 A | 10/1998 | Marshall et al. |
| 5,828,945 A | 10/1998 | Klosterman |
| 5,830,068 A | 11/1998 | Brenner et al. |
| 5,838,314 A | 11/1998 | Neel et al. |
| 5,844,620 A | 12/1998 | Coleman et al. |
| 5,847,750 A | 12/1998 | Srivastava et al. |
| 5,850,218 A | 12/1998 | LaJoie et al. |
| 5,858,866 A | 1/1999 | Berry et al. |
| 5,861,881 A | 1/1999 | Freeman et al. |
| 5,867,233 A | 2/1999 | Tanaka |
| 5,873,022 A | 2/1999 | Huizer et al. |
| 5,880,768 A | 3/1999 | Lemmons et al. |
| 5,884,141 A | 3/1999 | Inoue et al. |
| 5,886,731 A | 3/1999 | Ebisawa et al. |
| 5,886,732 A | 3/1999 | Humpleman |
| 5,887,243 A | 3/1999 | Harvey et al. |
| 5,892,535 A | 4/1999 | Allen et al. |
| 5,907,323 A | 5/1999 | Lawler et al. |
| 5,907,366 A | 5/1999 | Farmer et al. |
| 5,914,746 A | 6/1999 | Matthews, III et al. |
| 5,917,830 A | 6/1999 | Chen et al. |
| 5,929,849 A | 7/1999 | Kikinis |
| 5,940,073 A | 8/1999 | Klosterman et al. |
| 5,940,572 A | 8/1999 | Balaban et al. |
| 5,945,988 A * | 8/1999 | Williams et al. ............... 715/747 |
| 5,956,026 A | 9/1999 | Ratakonda |
| 5,959,623 A | 9/1999 | van Hoff et al. |
| 5,961,603 A | 10/1999 | Kunkel et al. |
| 5,973,684 A | 10/1999 | Brooks et al. |
| 5,974,222 A | 10/1999 | Yuen et al. |
| 5,977,964 A | 11/1999 | Williams et al. |
| 5,987,210 A | 11/1999 | Iggulden et al. |
| 5,988,078 A | 11/1999 | Levine |
| 5,990,881 A | 11/1999 | Inoue et al. |
| 5,995,092 A | 11/1999 | Yuen et al. |
| 6,002,393 A | 12/1999 | Hite et al. |
| 6,002,394 A | 12/1999 | Schein et al. |
| 6,005,603 A | 12/1999 | Flavin |
| 6,006,257 A | 12/1999 | Slezak |
| 6,006,265 A | 12/1999 | Rangan et al. |
| 6,014,137 A | 1/2000 | Burns |
| 6,014,184 A | 1/2000 | Knee et al. |
| 6,018,765 A | 1/2000 | Durana et al. |
| 6,018,768 A | 1/2000 | Ullman et al. |
| 6,020,912 A | 2/2000 | De Lang |
| 6,025,837 A | 2/2000 | Matthews, III et al. |
| 6,029,045 A | 2/2000 | Picco et al. |
| 6,038,367 A | 3/2000 | Abecassis |
| 6,049,539 A | 4/2000 | Lee et al. |
| 6,049,824 A | 4/2000 | Simonin |
| 6,057,872 A | 5/2000 | Candelore |
| 6,061,719 A | 5/2000 | Bendinelli et al. |
| 6,064,376 A | 5/2000 | Berezowski et al. |
| 6,067,303 A | 5/2000 | Aaker et al. |
| 6,075,551 A | 6/2000 | Berezowski et al. |
| 6,078,348 A | 6/2000 | Klosterman et al. |
| 6,097,383 A | 8/2000 | Gaughan et al. |
| 6,097,441 A | 8/2000 | Allport |
| 6,104,334 A | 8/2000 | Allport |
| 6,130,726 A | 10/2000 | Darbee et al. |
| 6,141,488 A | 10/2000 | Knudson et al. |
| 6,144,375 A | 11/2000 | Jain et al. |
| 6,151,017 A | 11/2000 | Suzuoka et al. |
| 6,151,059 A | 11/2000 | Schein et al. |
| 6,157,413 A | 12/2000 | Hanafee et al. |
| 6,160,545 A | 12/2000 | Eyer et al. |
| 6,160,546 A | 12/2000 | Thompson et al. |
| 6,172,677 B1 | 1/2001 | Stautner et al. |
| 6,173,271 B1 | 1/2001 | Goodman et al. |
| 6,177,931 B1 | 1/2001 | Alexander |
| 6,182,050 B1 | 1/2001 | Ballard |
| 6,186,443 B1 | 2/2001 | Shaffer |
| 6,208,384 B1 | 3/2001 | Schultheiss |
| 6,233,734 B1 | 5/2001 | Macrae et al. |
| 6,239,794 B1 | 5/2001 | Yuen et al. |
| 6,263,501 B1 | 7/2001 | Schein et al. |
| 6,268,849 B1 | 7/2001 | Boyer et al. |
| 6,310,886 B1 | 10/2001 | Barton |
| 6,331,852 B1 | 12/2001 | Gould et al. |
| 6,331,877 B1 | 12/2001 | Bennington et al. |
| 6,354,378 B1 | 3/2002 | Patel |
| 6,357,043 B1 | 3/2002 | Ellis et al. |
| 6,388,714 B1 | 5/2002 | Schein et al. |
| 6,430,743 B1 | 8/2002 | Matsuura |
| 6,446,261 B1 | 9/2002 | Rosser |
| 6,460,018 B1 | 10/2002 | Kasai et al. |
| 6,463,585 B1 | 10/2002 | Hendricks et al. |
| 6,477,579 B1 | 11/2002 | Kunkel et al. |
| 6,483,986 B1 | 11/2002 | Krapf |
| 6,483,987 B1 | 11/2002 | Goldschmidt Iki et al. |
| 6,486,920 B2 | 11/2002 | Arai et al. |
| 6,490,722 B1 | 12/2002 | Barton et al. |
| 6,546,556 B1 | 4/2003 | Kataoka et al. |
| 6,564,378 B1 | 5/2003 | Satterfield |
| 6,574,424 B1 | 6/2003 | Dimitri et al. |
| 6,580,870 B1 | 6/2003 | Kanazawa et al. |
| 6,581,207 B1 | 6/2003 | Sumita et al. |
| 6,594,825 B1 | 7/2003 | Goldschmidt Iki et al. |
| 6,598,228 B2 | 7/2003 | Hejna, Jr. |
| 6,609,253 B1 | 8/2003 | Swix et al. |
| 6,611,654 B1 | 8/2003 | Shteyn |

(56) References Cited

U.S. PATENT DOCUMENTS

| | | |
|---|---|---|
| 6,614,987 B1 | 9/2003 | Ismail et al. |
| 6,637,027 B1 | 10/2003 | Breslauer et al. |
| 6,642,939 B1 | 11/2003 | Vallone et al. |
| 6,660,503 B2 | 12/2003 | Kierulff |
| 6,698,020 B1 | 2/2004 | Zigmond et al. |
| 6,701,528 B1 | 3/2004 | Arsenault et al. |
| 6,704,491 B1 | 3/2004 | Revis |
| 6,728,713 B1 | 4/2004 | Beach et al. |
| 6,738,978 B1 | 5/2004 | Hendricks et al. |
| 6,742,183 B1 | 5/2004 | Reynolds et al. |
| 6,751,776 B1 | 6/2004 | Gong |
| 6,751,800 B1 | 6/2004 | Fukuda et al. |
| 6,756,997 B1 | 6/2004 | Ward, III et al. |
| 6,757,906 B1 | 6/2004 | Look et al. |
| 6,760,537 B2 | 7/2004 | Mankovitz |
| 6,799,326 B2 | 9/2004 | Boylan, III et al. |
| 6,802,074 B1 | 10/2004 | Mitsui et al. |
| 6,813,775 B1 | 11/2004 | Finseth et al. |
| 6,837,789 B2 | 1/2005 | Garahi et al. |
| 6,847,778 B1 | 1/2005 | Vallone et al. |
| 6,850,691 B1 | 2/2005 | Stam et al. |
| 6,868,440 B1 | 3/2005 | Gupta et al. |
| 6,950,624 B2 | 9/2005 | Kim et al. |
| 6,973,669 B2 | 12/2005 | Daniels |
| 7,017,173 B1 | 3/2006 | Armstrong et al. |
| 7,020,704 B1 | 3/2006 | Lipscomb et al. |
| 7,079,176 B1 | 7/2006 | Freeman et al. |
| 7,088,952 B1 | 8/2006 | Saito et al. |
| 7,134,136 B2 | 11/2006 | Hanai et al. |
| 7,184,848 B2 | 2/2007 | Krzyzanowski et al. |
| 7,185,353 B2 | 2/2007 | Schlack |
| 7,194,754 B2 | 3/2007 | Tomsen et al. |
| 7,200,852 B1 | 4/2007 | Block |
| 7,263,709 B1 | 8/2007 | Krapf |
| 7,359,619 B1 | 4/2008 | O'Connor et al. |
| 7,503,055 B2 | 3/2009 | Reynolds et al. |
| 7,584,491 B2 | 9/2009 | Bruckner et al. |
| 7,716,700 B2 | 5/2010 | Carlucci et al. |
| 8,312,500 B2 * | 11/2012 | Emerson et al. ............... 725/131 |
| 8,429,696 B2 * | 4/2013 | Tecot et al. ................... 725/80 |
| 8,516,521 B2 * | 8/2013 | Dasgupta ..................... 725/39 |
| 2001/0029610 A1 | 10/2001 | Corvin et al. |
| 2001/0047298 A1 | 11/2001 | Moore et al. |
| 2001/0049820 A1 | 12/2001 | Barton |
| 2002/0037160 A1 | 3/2002 | Locket et al. |
| 2002/0054062 A1 | 5/2002 | Gerba et al. |
| 2002/0056087 A1 | 5/2002 | Berezowski et al. |
| 2002/0083439 A1 | 6/2002 | Eldering |
| 2002/0083441 A1 | 6/2002 | Flickinger et al. |
| 2002/0090203 A1 | 7/2002 | Mankovitz |
| 2002/0092017 A1 | 7/2002 | Klosterman et al. |
| 2002/0104090 A1 | 8/2002 | Stettner |
| 2002/0124249 A1 | 9/2002 | Shintani et al. |
| 2002/0144262 A1 | 10/2002 | Plotnick et al. |
| 2002/0146233 A1 | 10/2002 | Barton et al. |
| 2002/0166120 A1 | 11/2002 | Boylan, III et al. |
| 2002/0174430 A1 | 11/2002 | Ellis et al. |
| 2002/0191954 A1 | 12/2002 | Beach et al. |
| 2002/0199186 A1 | 12/2002 | Ali et al. |
| 2003/0026589 A1 | 2/2003 | Barton et al. |
| 2003/0028761 A1 | 2/2003 | Platt |
| 2003/0037068 A1 | 2/2003 | Thomas et al. |
| 2003/0037333 A1 | 2/2003 | Ghashghai et al. |
| 2003/0056219 A1 | 3/2003 | Reichardt et al. |
| 2003/0110499 A1 | 6/2003 | Knudson et al. |
| 2003/0131252 A1 | 7/2003 | Barton |
| 2003/0131359 A1 | 7/2003 | Moskowitz |
| 2003/0163813 A1 | 8/2003 | Klosterman et al. |
| 2003/0163832 A1 | 8/2003 | Tsuria et al. |
| 2003/0164858 A1 | 9/2003 | Klosterman et al. |
| 2003/0182567 A1 | 9/2003 | Barton et al. |
| 2003/0188310 A1 | 10/2003 | Klosterman et al. |
| 2003/0188311 A1 | 10/2003 | Yuen et al. |
| 2003/0196201 A1 | 10/2003 | Schein et al. |
| 2003/0208756 A1 | 11/2003 | Macrae et al. |
| 2003/0219227 A1 | 11/2003 | Otala et al. |
| 2003/0234737 A1 | 12/2003 | Nelson et al. |
| 2004/0013406 A1 | 1/2004 | Barton et al. |
| 2004/0013409 A1 | 1/2004 | Beach et al. |
| 2004/0055008 A1 | 3/2004 | Ikeda |
| 2004/0223747 A1 | 11/2004 | Otala et al. |
| 2004/0237102 A1 | 11/2004 | Konig et al. |
| 2004/0261096 A1 | 12/2004 | Matz |
| 2005/0076359 A1 | 4/2005 | Pierson et al. |
| 2005/0120373 A1 | 6/2005 | Thomas et al. |
| 2005/0204388 A1 | 9/2005 | Knudson et al. |
| 2005/0240961 A1 | 10/2005 | Jerding et al. |
| 2005/0244138 A1 | 11/2005 | O'Connor et al. |
| 2005/0251827 A1 | 11/2005 | Ellis et al. |
| 2005/0283796 A1 | 12/2005 | Flickinger |
| 2006/0031883 A1 | 2/2006 | Ellis et al. |
| 2006/0271980 A1 | 11/2006 | Mankovitz |
| 2007/0192486 A1 | 8/2007 | Wilson et al. |
| 2007/0266400 A1 | 11/2007 | Rogers et al. |
| 2008/0127246 A1 | 5/2008 | Sylvain |
| 2008/0282285 A1 | 11/2008 | Thomas et al. |
| 2009/0228912 A1 | 9/2009 | Reynolds et al. |
| 2010/0106574 A1 | 4/2010 | Cartwright |
| 2010/0175080 A1 | 7/2010 | Yuen et al. |
| 2010/0180300 A1 | 7/2010 | Carpenter et al. |
| 2010/0192177 A1 | 7/2010 | Thomas et al. |
| 2010/0287258 A1 | 11/2010 | Takeuchi |

FOREIGN PATENT DOCUMENTS

| | | |
|---|---|---|
| CN | 1226030 | 8/1999 |
| DE | 31 51 492 | 7/1983 |
| DE | 195 31 121 | 2/1997 |
| DE | 197 40 079 | 3/1999 |
| EP | 0013096 | 7/1980 |
| EP | 0322909 | 7/1989 |
| EP | 0382764 | 8/1990 |
| EP | 0424648 | 5/1991 |
| EP | 0589369 | 3/1994 |
| EP | 0752767 | 1/1997 |
| EP | 0773682 | 5/1997 |
| EP | 0774853 | 5/1997 |
| EP | 0793225 | 9/1997 |
| EP | 0803701 | 10/1997 |
| EP | 0 805 594 | 11/1997 |
| EP | 0822718 | 2/1998 |
| EP | 0838820 | 4/1998 |
| EP | 0981248 | 2/2000 |
| EP | 1499113 | 1/2005 |
| EP | 1705908 | 9/2006 |
| EP | 2315441 A1 | 4/2011 |
| GB | 2227622 | 8/1990 |
| GB | 2265792 | 10/1993 |
| GB | 2307381 | 5/1997 |
| JP | 03022770 | 1/1991 |
| JP | 03063990 | 3/1991 |
| JP | 6022315 | 1/1994 |
| JP | 08-56352 | 2/1996 |
| JP | 08076778 | 3/1996 |
| JP | 8505498 | 6/1996 |
| JP | 8506939 | 7/1996 |
| JP | 09102827 | 4/1997 |
| JP | 9130346 | 5/1997 |
| JP | 9510327 | 10/1997 |
| JP | 10108145 | 4/1998 |
| JP | 11341370 | 12/1999 |
| RO | C247388 | 10/1994 |
| WO | WO-87/03766 | 6/1987 |
| WO | WO 88/04507 | 6/1988 |
| WO | WO 89/02682 | 3/1989 |
| WO | WO-89/03085 | 4/1989 |
| WO | WO 93/23957 | 11/1993 |
| WO | WO-94/14282 | 6/1994 |
| WO | WO 94/14284 | 6/1994 |
| WO | WO-95/01056 | 1/1995 |
| WO | WO-95/01059 | 1/1995 |
| WO | WO 95/04431 | 2/1995 |
| WO | WO 95/07003 | 3/1995 |
| WO | WO-95/10910 | 4/1995 |

(56) References Cited

FOREIGN PATENT DOCUMENTS

| | | |
|---|---|---|
| WO | WO-95/28055 | 10/1995 |
| WO | WO 95/31069 | 11/1995 |
| WO | WO-95/32585 | 11/1995 |
| WO | WO-96/07270 | 3/1996 |
| WO | WO 96/09721 | 3/1996 |
| WO | WO-96/13932 | 5/1996 |
| WO | WO-96/20555 | 7/1996 |
| WO | WO 96/34486 | 10/1996 |
| WO | WO 96/34491 | 10/1996 |
| WO | WO 96/41471 | 12/1996 |
| WO | WO 96/41478 | 12/1996 |
| WO | WO 97/03521 | 1/1997 |
| WO | WO 97/04595 | 2/1997 |
| WO | WO-97/13368 | 4/1997 |
| WO | WO 97/18675 | 5/1997 |
| WO | WO 97/19555 | 5/1997 |
| WO | WO 97/29458 | 8/1997 |
| WO | WO-97/31480 | 8/1997 |
| WO | WO-97/36422 | 10/1997 |
| WO | WO 97/42763 | 11/1997 |
| WO | WO 97/46943 | 12/1997 |
| WO | WO-97/47106 | 12/1997 |
| WO | WO 97/47124 | 12/1997 |
| WO | WO-97/47143 | 12/1997 |
| WO | WO 97/48230 | 12/1997 |
| WO | WO-97/49237 | 12/1997 |
| WO | WO 97/49241 | 12/1997 |
| WO | WO 97/49242 | 12/1997 |
| WO | WO-97/50251 | 12/1997 |
| WO | WO 98/00975 | 1/1998 |
| WO | WO 98/00976 | 1/1998 |
| WO | WO 99/04561 | 1/1998 |
| WO | WO 98/06219 | 2/1998 |
| WO | WO-98/10589 | 3/1998 |
| WO | WO-98/16062 | 4/1998 |
| WO | WO-98/17064 | 4/1998 |
| WO | WO 98/20675 | 5/1998 |
| WO | WO 98/26569 | 6/1998 |
| WO | WO-98/26584 | 6/1998 |
| WO | WO 98/26596 | 6/1998 |
| WO | WO 98/27723 | 6/1998 |
| WO | WO 98/39893 | 9/1998 |
| WO | WO 98/48566 | 10/1998 |
| WO | WO 98/51076 | 11/1998 |
| WO | WO 98/59493 | 12/1998 |
| WO | WO 99/03267 | 1/1999 |
| WO | WO 99/11065 | 3/1999 |
| WO | WO 99/13471 | 3/1999 |
| WO | WO-99/14947 | 3/1999 |
| WO | WO-99/30491 | 6/1999 |
| WO | WO 99/39280 | 8/1999 |
| WO | WO 99/45700 | 9/1999 |
| WO | WO 99/45702 | 9/1999 |
| WO | WO 99/56466 | 11/1999 |
| WO | WO 99/57904 | 11/1999 |
| WO | WO 99/60783 | 11/1999 |
| WO | WO 99/60789 | 11/1999 |
| WO | WO 99/66719 | 12/1999 |
| WO | WO 00/02380 | 1/2000 |
| WO | WO 00/04706 | 1/2000 |
| WO | WO 00/11869 | 3/2000 |
| WO | WO 00/16548 | 3/2000 |
| WO | WO 00/33560 | 6/2000 |
| WO | WO 00/33565 | 6/2000 |
| WO | WO 00/58834 | 10/2000 |
| WO | WO 00/59214 | 10/2000 |
| WO | WO 00/59223 | 10/2000 |
| WO | WO 00/62299 | 10/2000 |
| WO | WO 00/62533 | 10/2000 |
| WO | WO 00/79798 | 12/2000 |
| WO | WO 01/19086 | 3/2001 |
| WO | WO 01/46843 | 6/2001 |
| WO | WO 01/46869 | 6/2001 |
| WO | WO 01/47238 | 6/2001 |
| WO | WO 01/47249 | 6/2001 |
| WO | WO 01/47257 | 6/2001 |
| WO | WO 01/47273 | 6/2001 |
| WO | WO 01/47279 | 6/2001 |
| WO | WO 01/50743 | 7/2001 |
| WO | WO 01/58158 | 8/2001 |
| WO | WO 03/019932 | 3/2003 |
| WO | WO 03/058537 | 7/2003 |
| WO | WO 03/089100 | 10/2003 |
| WO | WO 03/094134 | 11/2003 |
| WO | WO 2004/063892 | 7/2004 |
| WO | WO 2004/095426 | 11/2004 |

OTHER PUBLICATIONS

U.S. Appl. No. 09/437,304, filed Nov. 9, 1999, Nguyen.
U.S. Appl. No. 09/492,713, filed Jan. 27, 2000, Forrer et al.
U.S. Appl. No. 10/105,128, filed Feb. 21, 2002, Jones.
U.S. Appl. No. 10/347,673, filed Jan. 17, 2003, Salce.
U.S. Appl. No. 10/927,814, filed Aug. 26, 2004, Huyne.
U.S. Appl. No. 11/179,410, filed Jul. 11, 2005, Grant.
U.S. Appl. No. 11/324,202, filed Dec. 29, 2005, Yates.
"Why Jini Now?", from the internet at http://java.sun.com/products/jini/whitepapers/whyjininow.pdf, printed on Jan. 25, 1999. The document bears a copyright date of 1998.
Von Andreas Neumann, "WDR Online Aufbau Und Perspektiven Automatisierter Online-Dienste Im WDR," Rundfunktechnische Mitteilungen, vol. 41, pp. 56-66, Jun. 1997.
Von Gerhard Eitz, "Zukunftige Informations-Und Datenangebote Beim Digitalen Fernsehen—EPG Und "Lesezeichen"," Rundfunktechnische Mitteilungen, vol. 41, pp. 67-72, Apr. 30, 1997.
"Honey, is there anything good on the remote tonight?", advertisement from Multichannel News, Braodband Week Section, p. 168, Nov. 30, 1998.
"How Evolve Works," from the Internet at http://www.evolveproducts.com/network.html, printed on Dec. 28, 1998.
"Jini Architecture Overview," by Jim Waldo, from the Internet at http://Java.sun.com/products/jini/whitepapers/architectureoverview.pdf/ pinted on Jan. 25, 1999. The document bears a copyright date of 1998.
"Reaching your subscribers is a complex andcostly process—until now," from the Internet at http://www.evolveproducts.com/info.html, printed on Dec. 28, 1998.
Curt Rogers, "Telcos vs. Cable TV: The Global View," Data Communications, No. 13, New York, pp. 75, 76, 78 and 80, Sep. 1995.
"Sun's Next Steps in Digital Set-Tops," article in Cablevision, p. 56, Nov. 16, 1998.
"The Evolve EZ Guide. The Remote. Control," from the Internet at http://www.evolveproducts.com/display2.html, printed on Dec. 28, 1998.
"Using Starsight 2," published before Apr. 19, 1995.
"What is Jini?", from the Internet at http://java.sun.com/products/jini/whitepapers/whatsjini.pdf, printed on Jan. 25, 1999.
Jaidev, "EXSLT—A Wired and Wireless Case Study," http://csharpcomputing.com/ XMLTutorial/Lession15.htm.
Randerson, J., "Let Sofware Catch the Game for You," New Scientist, Jul. 3, 2004.
Papers Delivered (Part1), 61st National Conference, Information Processing Society of Japan, Oct. 3-5, 2000.
Index Systems Inc., "Gemstar Service Object Model," Data Format Specification, Ver. 2.0.4, pp. 58-59.
Pogue, D., "State of the Art: For TiVo and Replay, New Reach," N.Y. Times, May 29, 2003.
Get your groove on: LAUNCHcast plug-in, http://www.ymessengerblog.com/blog/2008/07/29/get-your-groove-on-launchcast-plug-in/, printed Jun. 29, 2011, 5 pages.
Cramer C. et al, "Distributed Job Scheduling in a Peer-to-Peer Video Recording System" URL:http//i30www.ibds.uka.de/research/documents/p2p/2004/cramer04scheduling.pdf> [retrieved on May 5, 2004].
Digital Video Broadcasting (DVB); DVB specification for data broadcasting,European Telecommunications Standards Institute, Draft EN 301 192 V1.2.1 (1999).

(56) References Cited

OTHER PUBLICATIONS

Electronic Programme Guide (EPG); Protocol for a TV Guide using electronic data transmission, by European Telecommunication Standards Institute, May 1997, Valbonne, France, publication No. ETS 300 707.

Enhanced Content Specification, "ATVEF", from the Internet at http://www.atvef.com/library/spec.html, printed Aug. 22, 2001, the document bears a Copyright date of 1998, 1999, 2000.

Hartwig et al., "Broadcasting and Processing of Program Guides for Digital TV", SMPTE Journal, pp. 727-732, Oct. 1997.

Hofmann et al., "Videotext Programmiert Videorecorder," Rundfunktechnische Mitteilungen, Nov.-Dec. 1982, pp. 254-257.

Machine Transcription of JP 08076778.

Machine Transcription of JP 41016284.

Miller, "A Scenario for the Deployment of Interactive Multimedia Cable Television Systems in the United States in the 1990's", proceedings of the IEEE, vol. 82, No. 4, Apr. 1994, pp. 585-589.

OpenTV Launches OpenStreamer™ Technology for Broadcasters to Deliver First Ever Real-Time Digital Interactive Television, from the Internet at http://www.opentv.com/news/openstreamer_press_final.htm, printed on Jun. 28. 1999, the document bears a copyright date of 1999.

OpenTV(R) and Interactive Channel Form Strategic Alliance to Deliver Interactive Programming to Satellite Television Subscribers, from the Internet at http://www.opentv.com/news/interactivechannelfinal.htm, printed on Jun. 8, 1999.

Prevue Networks and OpenTV(R) Agree to Work Together on Deploying Interactive Program Guides Worldwide, from the Internet at http://www.opentv.com/news/prevuefinal.htm, printed on Jun. 28, 1999.

Rewind, replay and unwind with new high-tech TV devices, by Lawrence J. Magid, LA Times. This document was printed from the Internet on Jun. 6, 1999 and bears a date of May 19, 1999.

Technical White Paper, "OpenTV™ Operating Environment", (© 1998 OpenTV Inc.), pp. 1-12.

Verknüpfung von TV mit Internet, Forschung & Entwicklung, vol. 68, No. 18, Aug. 16, 1996, pp. 70-71, XP000631189.

Windows 98 Feature Combines TV, Terminal and the Internet, New York Times, Aug. 18, 1998.

* cited by examiner

1400

| Viewing Environment Preference |
|---|

```
<Viewing_Environment_Preference>
    <Media_Content_Association>
        <Media_Guidance_Data>
            <Title>Terminator 3</Title>
            <Genre>Action</Genre>
        </Media_Guidance_Data>
        <User_Profile_Data>
            <User>John</User>
            <interval_start>7 PM</interval_start>
            <interval_stop>8 PM</interval_stop>
        </User_Profile_Data>
    </Media_Content_Association>
    <General_Settings>
        <Prompt_Enabled>Y</Prompt_Enabled>
    </General_Settings>
    <Components>
        <Component_Index>1</Component_Index>
        <Component_Address>00:FF:00:11:22:33
        </Component_Address>
        <Component_Name>Doorbell<Component_Name>
        <Attribute_Index>1</Attribute_Index>
        <Attribute_Name>Volume</Attribute_Name>
        <Attribute_Metric>Decibels</Attribute_Metric>
        <Attribute_Value>10</Attribute_Value>
        <Attribute_Index>2</Attribute_Index>
        <Attribute_Name>Ringtone</Attribute_Name>
        <Attribute_Value>File1.wav</Attribute_Value>

<Component_Index>2</Component_Index>
        <Component_Address>00:FF:00:11:22:44
        </Component_Address>
        <Component_Name>Electric Blinds
        <Component_Name>
        <Attribute_Index>1</Attribute_Index>
        <Attribute_Name>Status</Attribute_Name>
        <Attribute_Value>Closed</Attribute_Value>
    </Components>
</Viewing_Environment_Preference>
```

FIG. 14

METHODS AND SYSTEMS FOR CUSTOMIZING VIEWING ENVIRONMENT PREFERENCES IN A VIEWING ENVIRONMENT CONTROL APPLICATION

BACKGROUND OF THE INVENTION

This application relates to the customization of viewing environments by a viewing environment control application, including an interactive media guidance application or widget.

Interactive media guidance applications provide a tool for users to parse through information about media content that may be available to a user through various providers (e.g., internet, broadcast television, and video-on-demand). Widgets are applications that run on a user equipment device that provide specific functions that may access stored user information from the user equipment device (e.g., a gallery widget or address book widget on Android phones), current information about the hardware of the user equipment device (e.g., the iStat Nano system monitor widget on Mac OS), or information from the internet (e.g., a weather widget on Mac OS).

A user often manually changes his viewing environment depending on the program the user is watching. For example, when watching a movie, a user may turn off lights, turn up speaker volume and silence phones. Alternatively, when watching a television broadcast program, a user may turn off speaker volume during commercial breaks. Manually changing attributes of components can be cumbersome, especially as the number of components increases. Current interactive media guidance applications and widgets are deficient in enabling a user to modify his viewing environment as a function of accessed media content.

SUMMARY OF THE INVENTION

Methods, systems and devices for customizing viewing environment preferences are provided in accordance with various embodiments of the present invention. In some embodiments, media content is accessed using a user equipment device that may be running an interactive media guidance application. A viewing environment preference may be configured and stored that defines attributes of components in the viewing environment. Media content can be associated to the viewing environment preference, such that when the associated media content is accessed by a user, the viewing environment is modified according to the associated viewing environment preference.

In some implementations, the components may be an appliance, user computer equipment or wireless user communication device that may affect a physical sensory environment of the user through one of the five basic senses: sight, touch, taste, smell and hearing. In some embodiments, the component may be an online social media service, or software, hardware or remote media server equipment that hosts the online social media service. User equipment device running the interactive media guidance application may transmit information to the remote server equipment to update a page on the online social media service in response to determining that an accessed media content is associated to a viewing environment preference.

In some implementations, a viewing environment preference may be generated automatically by an interactive media guidance application in response to determining that an accessed media content is not associated to a viewing environment preference. The generated media content association may be based on user profile information, or media guidance data.

In some embodiments, a widget application may provide the functionality to enable a user to configure a viewing environment preference and media content association. In some embodiments, a widget may be used to access media content, and modify a viewing environment in response to determining that the accessed media content is associated to a viewing environment preference. In some embodiments, a widget may be running in combination with an interactive media guidance application, or independent of an interactive media guidance application.

BRIEF DESCRIPTION OF THE DRAWINGS

FIG. 14 illustrates a data structure for storing a viewing environment preference in accordance with some embodiments of the invention.

DETAILED DESCRIPTION OF EMBODIMENTS

Figure 1:
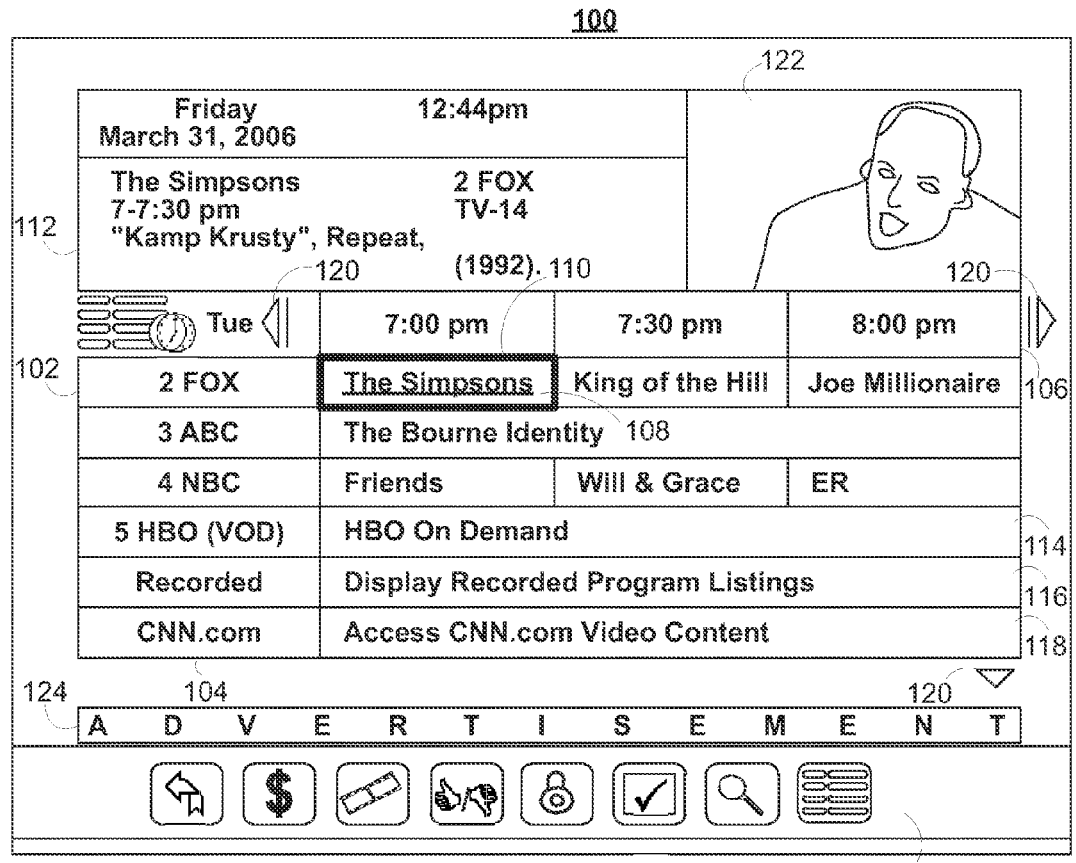
FIG. 1 illustrates an example of a grid display screen in an interactive media guidance application or a widget in accordance with some embodiments of the present invention.

Viewing environment control applications running on a user equipment device may enable a user to access media content and may enable modification of a viewing environment according to a stored viewing environment preference associated to the accessed media content. In some embodiments, the application may be an interactive media guidance application running on a user equipment device. In some embodiments, the application the application may be a widget running on a user equipment device.

The amount of media available to users in any given media delivery system can be substantial. Consequently, many users desire a form of media guidance through an interface that allows users to efficiently navigate media selections and easily identify media that they may desire. An application which provides such guidance is referred to herein as an interactive media guidance application, a media guidance application or a guidance application.

Interactive media guidance applications may take various forms depending on the media for which they provide guidance. One type of media guidance application is an interactive television program guide. Interactive television program guides (sometimes referred to as electronic program guides) are well-known guidance applications that, among other things, allow users to navigate among and locate many types of media content including conventional television programming (provided via traditional broadcast, cable, satellite, Internet, or other means), as well as pay-per-view programs, on-demand programs (as in video-on-demand (VOD) systems), Internet content (e.g., streaming media, downloadable media, Webcasts, etc.), and other types of media or video content. Guidance applications also allow users to navigate among and locate content related to the video content including, for example, video clips, articles, advertisements, chat sessions, games, etc. Guidance applications also allow users to navigate among and locate multimedia content. The term multimedia is defined herein as media and content that utilizes at least two different content forms, such as text, audio, still images, animation, video, and interactivity content forms. Multimedia content may be recorded and played, displayed or accessed by information content processing devices, such as computerized and electronic devices, but can also be part of a live performance. It should be understood that the invention embodiments that are discussed in relation to media content are also applicable to other types of content, such as video, audio and/or multimedia.

With the advent of the Internet, mobile computing, and high-speed wireless networks, users are accessing media on personal computers (PCs) and other devices on which they traditionally did not, such as hand-held computers, personal digital assistants (PDAs), mobile telephones, iPhones, iPads, Android phones, tablet computers, palmtop computers, smartphones or other mobile devices. On these devices users are able to navigate among and locate the same media available through a television. For example, users can stream video from the internet on these devices using service providers (e.g., Hulu, YouTube, AmazonOne, Netflix, etc.) Consequently, media guidance is necessary on these devices, as well. The guidance provided may be for media content available only through a television, for media content available only through one or more of these devices, or for media content available both through a television and one or more of these devices. The media guidance applications may be provided as on-line applications (i.e., provided on a web-site), or as stand-alone applications or clients on hand-held computers, PDAs, mobile telephones, iPhones, iPads, Android phones, tablet computers, palmtop computers, smartphones or other mobile devices. The various devices and platforms that may implement media guidance applications are described in more detail below.

Figure 2:
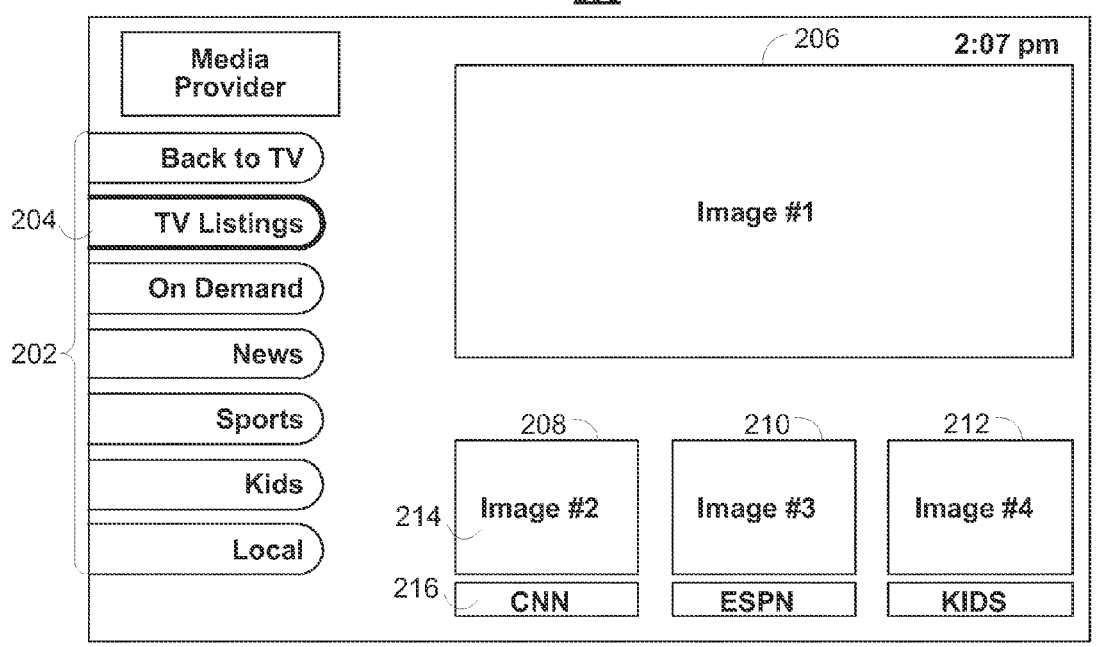
FIG. 2 illustrates an example of a mosaic display screen in an intheractive media guidance application in accordance with some embodiments of the present invention.

One of the functions of the media guidance application is to provide media listings and media information to users. FIGS. 1-2 show illustrative display screens that may be used to provide media guidance, and in particular media listings. The display screens shown in FIGS. 1-2 and 7-12 may be implemented on any suitable device or platform. While the display screens of FIGS. 1-2 and 7-12 are illustrated as full screen displays, they may also be fully or partially overlaid over media content being displayed. A user may indicate a desire to access media information by selecting a selectable option provided in a display screen (e.g., a menu option, a listings option, an icon, a hyperlink, etc.) or pressing a dedicated button (e.g., a GUIDE button) on a remote control or other user input interface or device. In response to the user's indication, the media guidance application may provide a display screen with media information organized in one of several ways, such as by time and channel in a grid, by time, by channel, by media type, by category (e.g., movies, sports, news, children, or other categories of programming), or other predefined, user-defined, or other organization criteria.

FIG. 1 shows illustrative grid program listings display screen 100 arranged by time and channel that also enables access to different types of media content in a single display. Display screen 100 may include grid 102 with: (1) a column of channel/media type identifiers 104, where each channel/media type identifier (which is a cell in the column) identifies a different channel or media type available; and (2) a row of time identifiers 106, where each time identifier (which is a cell in the row) identifies a time block of programming. Grid 102 also includes cells of program listings, such as program listing 108, where each listing provides the title of the program provided on the listing's associated channel and time. With a user input device, a user can select program listings by moving highlight region 110. Information relating to the program listing selected by highlight region 110 may be provided in program information region 112. Region 112 may include, for example, the program title, the program description, the time the program is provided (if applicable), the channel the program is on (if applicable), the program's rating, and other desired information.

In addition to providing access to linear programming provided according to a schedule, the media guidance application also provides access to non-linear programming which is not provided according to a schedule. Non-linear programming may include content from different media sources including on-demand media content (e.g., VOD), Internet content (e.g., streaming media, downloadable media, etc.), locally stored media content (e.g., video content stored on a digital video recorder (DVR), digital video disc (DVD), video cassette, compact disc (CD), etc.), or other time-insensitive media content. On-demand content may include both movies and original media content provided by a particular media provider (e.g., HBO On Demand providing "The Sopranos" and "Curb Your Enthusiasm"). HBO ON DEMAND is a service mark owned by Time Warner Company L. P. et al. and THE SOPRANOS and CURB YOUR ENTHUSIASM are trademarks owned by the Home Box Office, Inc. Internet content may include web events, such as a chat session or Webcast, or content available on-demand as streaming media or downloadable media through an Internet web site or other Internet access (e.g., FTP).

Grid 102 may provide listings for non-linear programming including on-demand listing 114, recorded media listing 116, and Internet content listing 118. A display screen combining listings for content from different types of media sources is sometimes referred to as a "mixed-media" display screen. The various permutations of the types of listings that may be displayed that are different than display screen 100 may be based on user selection or guidance application definition (e.g., a display of only recorded and broadcast listings, only on-demand and broadcast listings, etc.). As illustrated, listings 114, 116, and 118 are shown as spanning the entire time block displayed in grid 102 to indicate that selection of these listings may provide access to a display screen dedicated to on-demand listings, recorded listings, or Internet listings, respectively. In other embodiments, listings for these media types may be included directly in grid 102. Additional listings may be displayed in response to the user selecting one of the navigational icons 120. (Pressing an arrow key on a user input device may affect the display screen in a similar manner as selecting navigational icons 120.)

Display screen 100 may also include video region 122, advertisement 124, and options region 126. Video region 122 may allow the user to view and/or preview programs that are currently available, will be available, or were available to the user. The content of video region 122 may correspond to, or be independent from, one of the listings displayed in grid 102. Grid displays including a video region are sometimes referred to as picture-in-guide (PIG) displays. PIG displays and their functionalities are described in greater detail in Satterfield et al. U.S. Pat. No. 6,564,378, issued May 13, 2003 and Yuen et al. U.S. Pat. No. 6,239,794, issued May 29, 2001, which are hereby incorporated by reference herein in their entireties. PIG displays may be included in other media guidance application display screens of the present invention.

Advertisement 124 may provide an advertisement for media content that, depending on a viewer's access rights (e.g., for subscription programming), is currently available for viewing, will be available for viewing in the future, or may never become available for viewing, and may correspond to or be unrelated to one or more of the media listings in grid 102. Advertisement 124 may also be for products or services related or unrelated to the media content displayed in grid 102. Advertisement 124 may be selectable and provide further information about media content, provide information about a product or a service, enable purchasing of media content, a product, or a service, provide media content relating to the advertisement, etc. Advertisement 124 may be targeted based on a user's profile/preferences, monitored user activity, the type of display provided, or on other suitable targeted advertisement bases.

While advertisement 124 is shown as rectangular or banner shaped, advertisements may be provided in any suitable size, shape, and location in a guidance application display screen. For example, advertisement 124 may be provided as a rectangular shape that is horizontally adjacent to grid 102. This is sometimes referred to as a panel advertisement. In addition, advertisements may be overlaid over media content or a guidance application display screen or embedded within a display. Advertisements may also include text, images, rotating images, video clips, or other types of media content. Advertisements may be stored in the user equipment with the guidance application, in a database connected to the user equipment, in a remote location (including streaming media servers), or on other storage means or a combination of these locations. Providing advertisements in a media guidance application is discussed in greater detail in, for example, Knudson et al., U.S. patent application Ser. No. 10/347,673, filed Jan. 17, 2003, Ward, III et al. U.S. Pat. No. 6,756,997, issued Jun. 29, 2004, and Schein et al. U.S. Pat. No. 6,388, 714, issued May 14, 2002, which are hereby incorporated by reference herein in their entireties. It will be appreciated that advertisements may be included in other media guidance application display screens of the present invention.

Options region 126 may allow the user to access different types of media content, media guidance application displays, and/or media guidance application features. Options region 126 may be part of display screen 100 (and other display screens of the present invention), or may be invoked by a user by selecting an on-screen option or pressing a dedicated or assignable button on a user input device. The selectable options within options region 126 may concern features related to program listings in grid 102 or may include options available from a main menu display screen. Features related to program listings may include searching for other air times or ways of receiving a program, recording a program, enabling series recording of a program, setting program and/or channel as a favorite, purchasing a program, or other features. Options available from a main menu display screen may include search options, VOD options, parental control options, access to various types of listing displays, subscribe to a premium service, edit a user's profile, access a browse overlay, or other options.

The media guidance application may be personalized based on a user's preferences. A personalized media guidance application allows a user to customize displays and features to create a personalized "experience" with the media guidance application. This personalized experience may be created by allowing a user to input these customizations and/or by the media guidance application monitoring user activity to determine various user preferences. Users may access their personalized guidance application by logging in or otherwise identifying themselves to the guidance application. Customization of the media guidance application may be made in accordance with a user profile. The customizations may include varying presentation schemes (e.g., color scheme of displays, font size of text, etc.), aspects of media content listings displayed (e.g., only HDTV programming, user-specified broadcast channels based on favorite channel selections, re-ordering the display of channels, recommended media content, etc.), desired recording features (e.g., recording or series recordings for particular users, recording quality, etc.), parental control settings, and other desired customizations.

The media guidance application may allow a user to provide user profile information or may automatically compile user profile information. The media guidance application may, for example, monitor the media the user accesses and/or other interactions the user may have with the guidance application. Additionally, the media guidance application may obtain all or part of other user profiles that are related to a particular user (e.g., from other web sites on the Internet the user accesses, such as www.tvguide.com, from other media guidance applications the user accesses, from other interactive applications the user accesses, from a handheld device of the user, etc.), and/or obtain information about the user from other sources that the media guidance application may access. As a result, a user can be provided with a unified guidance application experience across the user's different devices. This type of user experience is described in greater detail below in connection with FIG. 4. Additional personalized media guidance application features are described in greater detail in Ellis et al., U.S. patent application Ser. No. 11/179, 410, filed Jul. 11, 2005, Boyer et al., U.S. patent application Ser. No. 09/437,304, filed Nov. 9, 1999, and Ellis et al., U.S.

patent application Ser. No. 10/105,128, filed Feb. 21, 2002, which are hereby incorporated by reference herein in their entireties.

Another display arrangement for providing media guidance is shown in FIG. 2. Video mosaic display screen 200 includes selectable options 202 for media content information organized based on media type, genre, and/or other organization criteria. In display screen 200, television listings option 204 is selected, thus providing listings 206, 208, 210, and 212 as broadcast program listings. Unlike the listings from FIG. 1, the listings in display screen 200 are not limited to simple text (e.g., the program title) and icons to describe media. Rather, in display screen 200 the listings may provide graphical images including cover art, still images from the media content, video clip previews, live video from the media content, or other types of media that indicate to a user the media content being described by the listing. Each of the graphical listings may also be accompanied by text to provide further information about the media content associated with the listing. For example, listing 208 may include more than one portion, including media portion 214 and text portion 216. Media portion 214 and/or text portion 216 may be selectable to view video in full-screen or to view program listings related to the video displayed in media portion 214 (e.g., to view listings for the channel that the video is displayed on).

The listings in display screen 200 are of different sizes (i.e., listing 206 is larger than listings 208, 210, and 212), but if desired, all the listings may be the same size. Listings may be of different sizes or graphically accentuated to indicate degrees of interest to the user or to emphasize certain content, as desired by the media provider or based on user preferences. Various systems and methods for graphically accentuating media listings are discussed in, for example, Yates, U.S. patent application Ser. No. 11/324,202, filed Dec. 29, 2005, which is hereby incorporated by reference herein in its entirety.

Widgets are applications (i.e., collections of instructions executable by a processor) that provide specific functions that may access stored user information from the user equipment device (e.g., a gallery widget or address book widget on Android phones), current information about hardware of the user equipment device (e.g., the iStat Nano system monitor widget on Mac OS), or information from the Internet (e.g., a weather widget on Mac OS) and/or otherwise remotely accessible servers (hereinafter "remote servers") to a user. A widget may provide information from the Internet through web services and/or using any suitable communication protocol (e.g., TCP/IP, IPTV, etc.). A widget may access information from the user equipment device and about the hardware of the user equipment device through APIs offered by software development platforms (e.g., the AppWidget Framework for Android, Dashboard Framework for Mac OX, etc.).

Widgets may perform local processing tasks, such as guiding a user to set configure viewing environment preferences. For example, a widget may guide a user through a set of menus that enable the user to configure media content associations, components and settings of attributes of components.

A widget may run on a television, user equipment device associated with a television, and/or other user equipment devices capable of providing media to a user (e.g., laptop, a mobile phone, e-reader, camera, computer, mobile device, or video player). Television widgets are widgets that run strictly on the hardware platform (e.g., control circuitry) of a television. Typically, television widgets have limited interactions with external user equipment devices and databases, such as set top boxes and third party servers. It will be understood that where the below description refers to a widget or widgets, the term is inclusive of television widgets and other applications with widget-type functionality. For example, a widget may include a JAVA applet executable on a mobile device or any other software application executable on the mobile device (e.g., iPhone application or Android application). JAVA is a registered trademark owned by Sun Microsystems, Inc. In some implementations, the widget may be downloaded or received from a remote server to the mobile device over an open market for free or for a fee from an application store (e.g., marketplace or app store) which is hosted by a remote server. Similarly, a widget that can enable a user to configure viewing environment preferences, access media content, and modify the viewing environment according to stored viewing environment preferences associated to the accessed media content may be downloaded.

It should be understood that although a viewing environment control application is described in the context of being implemented using a widget running on a media equipment device, the viewing environment control application may be implemented in whole or in part using any suitable software application that is executed on a suitable device, such as an interactive media guidance application. The various embodiments of a widget that can control a viewing environment of a user according to a stored viewing environment preference can be described analogously as the various embodiments of an interactive media guidance application that can control a viewing environment of a user. Illustrative display screens of a widget may be described by the overlay screens 826, 926, 1026, 1126, and 1226 of FIGS. 8, 9, 10, 11, and 12 respectively. These screens will be described in more detail in the description of the figures.

Figure 3:
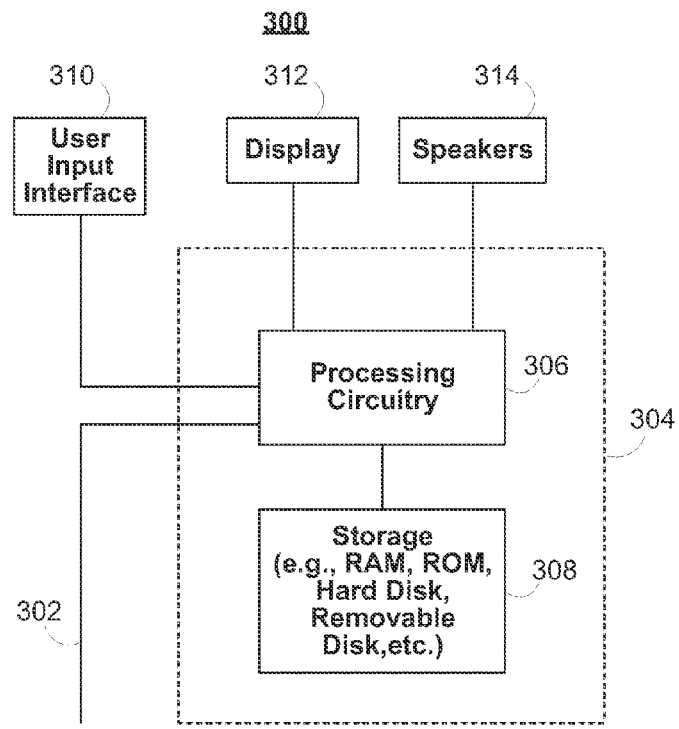
FIG. 3 illustrates an example of user equipment devices that may implement an interactive media guidance application or widget in accordance with some embodiments of the present invention.

Users may access media content and a media guidance application or a widget (and its display screens described above and below) from one or more of their user equipment devices. FIG. 3 shows a generalized embodiment of illustrative user equipment device 300. More specific implementations of user equipment devices are discussed below in connection with FIG. 4. User equipment device 300 may receive media content and data via input/output (hereinafter "I/O") path 302. I/O path 302 may provide media content (e.g., broadcast programming, on-demand programming, Internet content, and other video or audio) and data to control circuitry 304, which includes processing circuitry 306 and storage 308. Control circuitry 304 may be used to send and receive commands, requests, and other suitable data using I/O path 302. I/O path 302 may connect control circuitry 304 (and specifically processing circuitry 306) to one or more communications paths (described below). I/O functions may be provided by one or more of these communications paths, but are shown as a single path in FIG. 3 to avoid overcomplicating the drawing.

Control circuitry 304 may be based on any suitable processing circuitry 306 such as processing circuitry based on one or more microprocessors, microcontrollers, digital signal processors, programmable logic devices, etc. In some embodiments, control circuitry 304 executes instructions for a media guidance application stored in memory (i.e., storage 308). In client-server based embodiments, control circuitry 304 may include communications circuitry suitable for communicating with a guidance application server or other networks or servers. Communications circuitry may include a cable modem, an integrated services digital network (ISDN) modem, a digital subscriber line (DSL) modem, a telephone modem, or a wireless modem for communications with other equipment. Such communications may involve the Internet or any other suitable communications networks or paths (which is described in more detail in connection with FIG. 4). In addition, communications circuitry may include circuitry that enables peer-to-peer communication of user equipment devices, or communication of user equipment devices in locations remote from each other (described in more detail below).

Memory (e.g., random-access memory, read-only memory, or any other suitable memory), hard drives, optical drives, or any other suitable fixed or removable storage devices (e.g., DVD recorder, CD recorder, video cassette recorder, or other suitable recording device) may be provided as storage 308 that is part of control circuitry 304. Storage 308 may include one or more of the above types of storage devices. For example, user equipment device 300 may include a hard drive for a DVR (sometimes called a personal video recorder, or PVR) and a DVD recorder as a secondary storage device. Storage 308 may be used to store various types of media described herein and guidance application data, including program information, guidance application settings, user preferences or profile information, or other data used in operating the guidance application. Nonvolatile memory may also be used (e.g., to launch a boot-up routine and other instructions).

Control circuitry 304 may include video generating circuitry and tuning circuitry, such as one or more analog tuners, one or more MPEG-2 decoders or other digital decoding circuitry, high-definition tuners, or any other suitable tuning or video circuits or combinations of such circuits. Encoding circuitry (e.g., for converting over-the-air, analog, or digital signals to MPEG signals for storage) may also be provided. Control circuitry 304 may also include scaler circuitry for upconverting and downconverting media into the preferred output format of the user equipment 300. Circuitry 304 may also include digital-to-analog converter circuitry and analog-to-digital converter circuitry for converting between digital and analog signals. The tuning and encoding circuitry may be used by the user equipment to receive and to display, to play, or to record media content. The tuning and encoding circuitry may also be used to receive guidance data. The circuitry described herein, including for example, the tuning, video generating, encoding, decoding, scaler, and analog/digital circuitry, may be implemented using software running on one or more general purpose or specialized processors. Multiple tuners may be provided to handle simultaneous tuning functions (e.g., watch and record functions, picture-in-picture (PIP) functions, multiple-tuner recording, etc.). If storage 308 is provided as a separate device from user equipment 300, the tuning and encoding circuitry (including multiple tuners) may be associated with storage 308.

A user may control the control circuitry 304 using user input interface 310. User input interface 310 may be any suitable user interface, such as a remote control, mouse, trackball, keypad, keyboard, touch screen, touch pad, stylus input, joystick, voice recognition interface, or other user input interfaces. Display 312 may be provided as a stand-alone device or integrated with other elements of user equipment device 300. Display 312 may be one or more of a monitor, a television, a liquid crystal display (LCD) for a mobile device, or any other suitable equipment for displaying visual images. In some embodiments, display 312 may be HDTV-capable. Speakers 314 may be provided as integrated with other elements of user equipment device 300 or may be stand-alone units. The audio component of videos and other media content displayed on display 312 may be played through speakers 314. In some embodiments, the audio may be distributed to a receiver (not shown), which processes and outputs the audio via speakers 314.

A viewing environment of a user may be defined by characteristics of the surroundings that relate to a user's experience of viewing media content. In some embodiments, the characteristics may be affected by attributes of components external to a user equipment device running an interactive media guidance application or a widget. The external component is external to the user equipment device running the media guidance application or widget. The term component may be interchangeable with the term external component, component equipment, external component equipment, or environment device. The component may be software, hardware, an equipment, device or system. In some embodiments the components may be an appliance, user equipment, user computer equipment or wireless user communications device that directly affects the viewing experience through the physical senses of the user. Such physical senses include taste, touch, smell, sight and hearing. The component may be a refrigerator, doorbell, ceiling fan, air conditioning unit, electric window blinds, dishwasher, laundry machine, or any other suitable appliance. The component may also be a laptop computer, telephone, PDA, or any other suitable device or equipment.

Attributes are properties of the components that can be changed to affect the viewing environment. Examples of attributes include volume of speakers, volume of phone ringers, and brightness of lights. Attributes may depend on a component. For example, a telephone may have a volume attribute that affects an auditory experience, while lights have a brightness attribute that affects visual experience. The term attribute may refer to different types of properties (e.g., volume, brightness, etc.) or settings of properties (e.g., decibels, lumens, etc.).

A user often modifies his viewing environment by changing attributes of components depending on the media content the user is watching. For example, while watching a movie on a home entertainment system, a user may want to reduce background noise and lighting to provide a quiet theatre-like environment. The user may close the window blinds to block sunlight, silence phone ringers, turn-off lights, and raise speaker volume. Alternatively, when watching sports, a user may want to emulate the environment of an outdoor stadium by raising volume and opening the electric blinds to let natural sunlight in to the viewing room.

A viewing environment preference may be defined as a set of components and attributes of components that describe an instance of a viewing environment. A viewing environment preference may also have a descriptive label. For example, a viewing environment preference labeled movie watching may include blinds: closed, phone: ringers silenced, lights: off, and speakers: raised volume. A viewing environment preference labeled sports watching may include blinds: open, and speakers: raised volume.

In some embodiments, a viewing environment preference may be stored as a data structure as illustrated in FIG. 14. Processing circuitry 306 may generate a data structure and store the data structure in storage 308. For example, section 1450 describes external components and attributes of external components. In particular, section 1452 and 1460 describe components. For example, section 1452 describes the component doorbell, and attributes volume and ringtone. Settings for the attributes of volume and ringtone are also described. In an embodiment, processing circuitry 306 may transmit data to an external component to modify a setting of the external component according to a component and attribute setting in a stored viewing environment preference. For example, processing circuitry 306 may transmit a data packet containing all information corresponding to a component index (e.g. all elements between 1452 to 1460 in FIG. 14), to component Doorbell. Processing circuitry 306 may transmit the data packet across I/O path 302, across communications network 414 to external component 424. As an example, the communications network may be an 802.11 wireless connection. Processing circuitry 306 may direct the transmitted packet to the MAC address of the doorbell as described in element 1453 of FIG. 14. Further information regarding communication methods and protocols will be described in description of FIG. 4. Further information regarding the data structure will be described in the description of FIG. 14.

In some embodiments, the interactive media guidance application or widget may transmit updates to an online social media service, in addition to modifying the viewing environment of the user. The updates may include information about the media content being accessed by a user. Examples of such online social media services include Facebook, Twitter, Orkut, Hi5, Yahoo 360! and Myspace. Attributes of these components may be status updates, or information transmitted by a user equipment device 300 of FIG. 3 to the software, hardware, or remote server equipment that may be used to display the status updates. As an example, when a user is watching a sports broadcast such as the Superbowl, information may be sent from an interactive media guidance application or widget to a user's facebook page, indicating that the user is watching certain portions of the superbowl. This can inform the user's peers who may be interested in the same program.

A media content association is a set of information that is used to determine whether an accessed media content in an interactive media guidance application or widget is associated with a previously stored viewing environment preference. The media content association may include media guidance data, user profile information or other related information. In some embodiments, the media content associations are stored with a viewing environment preference. In some embodiments, a viewing environment preference may be understood as containing media content associations.

In some embodiments, a media content association includes media guidance data. For example, a media content association of a viewing environment preference may be the category: movie, and genre: action. The viewing environment preference may contain the following components and attributes: speakers: high volume, subwoofer: high bass and lights: low brightness. When user equipment device 300 receives an input from user input interface 310 that selects the film, Terminator 3: Rise of the Machines, processing circuitry 306 determines that the accessed media content is category: movie and genre: action, and is therefore associated with the viewing environment preference. Consequently, the processing circuitry 306 may transmit signals through I/O path 302 to the speakers to raise volume, to the subwoofer to increase bass, and to the lights to dim brightness. The transmitted signals may be data packets containing elements of a viewing environment preference data structure, as shown in FIG. 14. Examples of communication protocols used to send these packets include USB, 802.11, Bluetooth, 802.3 ethernet, or any suitable communication protocols. These will be further discussed in the description of FIG. 4. As a result, the viewing environment is modified according to the viewing environment preference.

In some embodiments, media content associations may be based on user profile information and media guidance data. A media content association may require that a specific user access the interactive media guidance application or widget at a certain time of day. For example, a media content association of a viewing environment preference may be user: John and time: after 8:00 PM, in addition to category: movie, and genre: action. Thus, if user equipment device 300 receives input from user input interface 310 from user Jane to access an action movie after 10:00 PM, processing circuitry 306 determines that the media content is not accessed by user: John and not associated to the viewing environment preference. Alternatively, if user equipment device 300 receives input from user input interface 310 from user John to access an action movie at 10:00 PM, processing circuitry 306 determines that the media content is accessed by user: John and is associated to the viewing environment preference. However, if user equipment device 300 receives input from user input interface 310 from user Jane to access an action movie at 8:00 PM, processing circuitry 306 determines that the media content is not accessed at time: after 8:00 PM and is not associated to the viewing environment preference.

In some embodiments, processing circuitry 306 may change the viewing environment during commercial breaks. For example, there may exist a television broadcast viewing environment preference and a commercial viewing environment preference. The television broadcast viewing environment preference may be associated to media type: broadcast and specify speakers: volume high and lights: off. The commercial viewing environment preference may be associated to an advertisement media guidance data and specify speakers: mute, and lights on. When user equipment device 300 receives input from user input interface 310 to access a television broadcast, processing circuitry 306 determines that the accessed media content is type: broadcast and is associated to the television broadcast viewing environment preference. Alternatively, in response to receiving by user equipment device 300 media content and associated media guidance information from I/O path 302, processing circuitry 306 may determine that the accessed media content is of type: television broadcast and is associated to the television broadcast viewing environment preference. Consequently, processing circuitry 306 may transmit commands to speakers 314 to raise volume, transmit commands through I/O path 302 to turn off lights. When user equipment device 300 receives from I/O path 302 media content and media guidance data indicative of a commercial, processing circuitry 306 determines that the accessed content is an advertisement. Consequently, processing circuitry 306 transmits commands to mute speakers 314, and transmits commands through I/O path 302 to turn on lights. It will be understood that commercials are a media content that may have corresponding media guidance data in the form of advertisement information.

The guidance application may be implemented using any suitable architecture. For example, it may be a stand-alone application wholly implemented on user equipment device 300. In such an approach, instructions of the application are stored locally, and data for use by the application is downloaded on a periodic basis (e.g., from the VBI of a television channel, from an out-of-band feed, or using another suitable approach). In another embodiment, the media guidance application is a client-server based application. Data for use by a thick or thin client implemented on user equipment device 300 is retrieved on-demand by issuing requests to a server remote to the user equipment device 300. In one example of a client-server based guidance application, control circuitry 304 runs a web browser that interprets web pages provided by a remote server.

In some embodiments, the media guidance application or widget is downloaded and interpreted or otherwise run by an interpreter or virtual machine (run by control circuitry 304). In some embodiments, the guidance application or widget may be encoded in the ETV Binary Interchange Format (EBIF), received by control circuitry 304 as part of a suitable feed, and interpreted by a user agent running on control circuitry 304. For example, the guidance application may be a EBIF widget. In other embodiments, the guidance application may be defined by a series of JAVA-based files that are received and run by a local virtual machine or other suitable middleware executed by control circuitry 304. In some of such embodiments (e.g., those employing MPEG-2 or other digital media encoding schemes), the guidance application may be, for example, encoded and transmitted in an MPEG-2 object carousel with the MPEG audio and video packets of a program.

Figure 4:
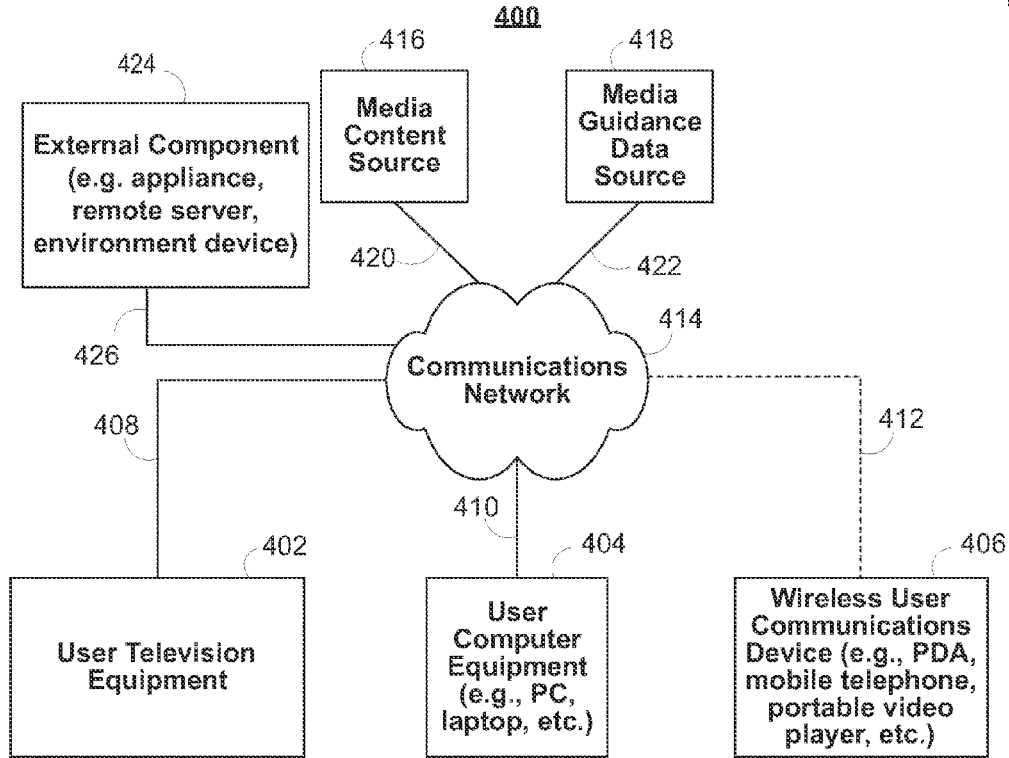
FIG. 4 illustrates an example of a system that implements an interactive media guidance application or widget that interfaces with external components in accordance with some embodiments of the present invention.

User equipment device 300 of FIG. 3 can be implemented in system 400 of FIG. 4 as user television equipment 402, user computer equipment 404, wireless user communications device 406, or any other type of user equipment suitable for accessing media, such as a non-portable gaming machine. For simplicity, these devices may be referred to herein collectively as user equipment or user equipment devices. User equipment devices, on which a media guidance application is implemented, may function as a standalone device or may be part of a network of devices. Various network configurations of devices may be implemented and are discussed in more detail below.

System 400 of FIG. 4 may include external component equipment 424 in addition to the other elements. The external component 424 includes appliances, remote server equipment and any other equipment that may be part of the user viewing environment. In some embodiments, user television equipment 402, user computer equipment 404 and wireless user communications device 405 and may be considered as an external component 424 whose attributes may be modified by viewing environment preferences. In some embodiments, external component 424 may communicate with a user equipment device 300 through I/O path 302 and communications network 414 via wired connections or wireless connections.

User television equipment 402 may include a set-top box, an integrated receiver decoder (IRD) for handling satellite television, a television set, a digital storage device, a DVD recorder, a video-cassette recorder (VCR), a local media server, or other user television equipment. One or more of these devices may be integrated to be a single device, if desired. User computer equipment 404 may include a PC, a laptop, a tablet, a WebTV box, a personal computer television (PC/TV), a PC media server, a PC media center, or other user computer equipment. WEBTV is a trademark owned by Microsoft Corp. Wireless user communications device 406 may include PDAs, a mobile telephone, a portable video player, a portable music player, a portable gaming machine, or other wireless devices.

It should be noted that with the advent of television tuner cards for PC's, WebTV, and the integration of video into other user equipment devices, the lines have become blurred when trying to classify a device as one of the above devices. In fact, each of user television equipment 402, user computer equipment 404, and wireless user communications device 406 may utilize at least some of the system features described above in connection with FIG. 3 and, as a result, include flexibility with respect to the type of media content available on the device. For example, user television equipment 402 may be Internet-enabled allowing for access to Internet content, while user computer equipment 404 may include a tuner allowing for access to television programming. The media guidance application may also have the same layout on the various different types of user equipment or may be tailored to the display capabilities of the user equipment. For example, on user computer equipment, the guidance application may be provided as a web site accessed by a web browser. In another example, the guidance application may be scaled down for wireless user communications devices.

In system 400, there is typically more than one of each type of user equipment device but only one of each is shown in FIG. 4 to avoid overcomplicating the drawing. In addition, each user may utilize more than one type of user equipment device (e.g., a user may have a television set and a computer) and also more than one of each type of user equipment device (e.g., a user may have a PDA and a mobile telephone and/or multiple television sets).

The user may also set various settings to maintain consistent media guidance application settings across in-home devices and remote devices. Settings include those described herein, as well as channel and program favorites, programming preferences that the guidance application utilizes to make programming recommendations, display preferences, and other desirable guidance settings. For example, if a user sets a channel as a favorite on, for example, the web site www.tvguide.com on their personal computer at their office, the same channel would appear as a favorite on the user's in-home devices (e.g., user television equipment and user computer equipment) as well as the user's mobile devices, if desired. Therefore, changes made on one user equipment device can change the guidance experience on another user equipment device, regardless of whether they are the same or a different type of user equipment device. In addition, the changes made may be based on settings input by a user, as well as user activity monitored by the guidance application.

The user equipment devices may be coupled to communications network 414. Namely, user television equipment 402, user computer equipment 404, and wireless user communications device 406 are coupled to communications network 414 via communications paths 408, 410, and 412, respectively. Communications network 414 may be one or more networks including the Internet, a mobile phone network, mobile device (e.g., Blackberry) network, cable network, public switched telephone network, or other types of communications network or combinations of communications networks. BLACKBERRY is a service mark owned by Research In Motion Limited Corp. Paths 408, 410, and 412 may separately or together include one or more communications paths, such as, a satellite path, a fiber-optic path, a cable path, a path that supports Internet communications (e.g., IPTV), free-space connections (e.g., for broadcast or other wireless signals), or any other suitable wired or wireless communications path or combination of such paths. Path 412 is drawn with dotted lines to indicate that in the exemplary embodiment shown in FIG. 4 it is a wireless path and paths 408 and 410 are drawn as solid lines to indicate they are wired paths (although these paths may be wireless paths, if desired). Communications with the user equipment devices may be provided by one or more of these communications paths, but are shown as a single path in FIG. 4 to avoid overcomplicating the drawing.

Although communications paths are not drawn between user equipment devices, these devices may communicate directly with each other via communication paths, such as those described above in connection with paths 408, 410, and 412, as well other short-range point-to-point communication paths, such as USB cables, IEEE 1394 cables, ethernet cables, wireless paths (e.g., Bluetooth, infrared, IEEE 802-11x, wireless USB, etc.), or other short-range communication via wired or wireless paths. BLUETOOTH is a certification mark owned by Bluetooth SIG, INC. The user equipment devices may also communicate with each other directly through an indirect path via communications network 414.

System 400 includes media content source 416 and media guidance data source 418 coupled to communications network 414 via communication paths 420 and 422, respectively. Paths 420 and 422 may include any of the communication paths described above in connection with paths 408, 410, and 412. Communications with the media content source 416 and media guidance data source 418 may be exchanged over one or more communications paths, but are shown as a single path in FIG. 4 to avoid overcomplicating the drawing. In addition, there may be more than one of each of media content source 416 and media guidance data source 418, but only one of each is shown in FIG. 4 to avoid overcomplicating the drawing. (The different types of each of these sources are discussed below.) If desired, media content source 416 and media guidance data source 418 may be integrated as one source device. Although communications between sources 416 and 418 with user equipment devices 402, 404, and 406 are shown as through communications network 414, in some embodiments, sources 416 and 418 may communicate directly with user equipment devices 402, 404, and 406 via communication paths (not shown) such as those described above in connection with paths 408, 410, and 412.

Media content source 416 may include one or more types of media distribution equipment including a television distribution facility, cable system headend, satellite distribution facility, programming sources (e.g., television broadcasters, such as NBC, ABC, HBO, etc.), intermediate distribution facilities and/or servers, Internet providers, on-demand media servers, and other media content providers. NBC is a trademark owned by the National Broadcasting Company, Inc., ABC is a trademark owned by the ABC, INC., and HBO is a trademark owned by the Home Box Office, Inc. Media content source 416 may be the originator of media content (e.g., a television broadcaster, a Webcast provider, etc.) or may not be the originator of media content (e.g., an on-demand media content provider, an Internet provider of video content of broadcast programs for downloading, etc.). Media content source 416 may include cable sources, satellite providers, on-demand providers, Internet providers, or other providers of media content. Media content source 416 may also include a remote media server used to store different types of media content (including video content selected by a user), in a location remote from any of the user equipment devices. Systems and methods for remote storage of media content, and providing remotely stored media content to user equipment are discussed in greater detail in connection with Ellis et al., U.S. patent application Ser. No. 09/332,244, filed Jun. 11, 1999, which is hereby incorporated by reference herein in its entirety.

Media guidance data source 418 may provide media guidance data, such as media listings, media-related information (e.g., broadcast times, broadcast channels, media titles, media descriptions, ratings information (e.g., parental control ratings, critic's ratings, etc.), genre or category information, actor information, logo data for broadcasters' or providers' logos, etc.), media format (e.g., standard definition, high definition, etc.), advertisement information (e.g., text, images, media clips, etc.), on-demand information, and any other type of guidance data that is helpful for a user to navigate among and locate desired media selections.

Media guidance application data may be provided to the user equipment devices using any suitable approach. In some embodiments, the guidance application may be a stand-alone interactive television program guide that receives program guide data via a data feed (e.g., a continuous feed, trickle feed, or data in the vertical blanking interval of a channel). Program schedule data and other guidance data may be provided to the user equipment on a television channel sideband, in the vertical blanking interval of a television channel, using an in-band digital signal, using an out-of-band digital signal, or by any other suitable data transmission technique. Program schedule data and other guidance data may be provided to user equipment on multiple analog or digital television channels. Program schedule data and other guidance data may be provided to the user equipment with any suitable frequency (e.g., continuously, daily, a user-specified period of time, a system-specified period of time, in response to a request from user equipment, etc.). In some approaches, guidance data from media guidance data source 418 may be provided to users' equipment using a client-server approach. For example, a guidance application client residing on the user's equipment may initiate sessions with source 418 to obtain guidance data when needed. Media guidance data source 418 may provide user equipment devices 402, 404, and 406 the media guidance application itself or software updates for the media guidance application.

Media guidance applications may be, for example, stand-alone applications implemented on user equipment devices. In other embodiments, media guidance applications may be client-server applications where only the client resides on the user equipment device. For example, media guidance applications may be implemented partially as a client application on control circuitry 304 of user equipment device 300 and partially on a remote server as a server application (e.g., media guidance data source 418). The guidance application display screens may be generated by the media guidance data source 418 and transmitted to the user equipment devices. The media guidance data source 418 may also transmit data for storage on the user equipment, which then generates the guidance application display screens based on instructions processed by control circuitry.

Media guidance system 400 is intended to illustrate a number of approaches, or network configurations, by which user equipment devices and sources of media content and guidance data may communicate with each other for the purpose of accessing media and providing media guidance. The present invention may be applied in any one or a subset of these approaches, or in a system employing other approaches for delivering media and providing media guidance. The following three approaches provide specific illustrations of the generalized example of FIG. 4.

In one approach, user equipment devices may communicate with each other within a home network. User equipment devices can communicate with each other directly via short-range point-to-point communication schemes described above, via indirect paths through a hub or other similar device provided on a home network, or via communications network 414. Each of the multiple individuals in a single home may operate different user equipment devices on the home network. As a result, it may be desirable for various media guidance information or settings to be communicated between the different user equipment devices. For example, it may be desirable for users to maintain consistent media guidance application settings on different user equipment devices within a home network, as described in greater detail in Ellis et al., U.S. patent application Ser. No. 11/179,410, filed Jul. 11, 2005. Different types of user equipment devices in a home network may also communicate with each other to transmit media content. For example, a user may transmit media content from user computer equipment to a portable video player or portable music player.

In a second approach, users may have multiple types of user equipment by which they access media content and obtain media guidance. For example, some users may have home networks that are accessed by in-home and mobile devices. Users may control in-home devices via a media guidance application implemented on a remote device. For example, users may access an online media guidance application on a website via a personal computer at their office, or a mobile device such as a PDA or web-enabled mobile telephone. The user may set various settings (e.g., recordings, reminders, or other settings) on the online guidance application to control the user's in-home equipment. The online guide may control the user's equipment directly, or by communicating with a media guidance application on the user's in-home equipment. Various systems and methods for user equipment devices communicating, where the user equipment devices are in locations remote from each other, is discussed in, for example, Ellis et al., U.S. patent application Ser. No. 10/927,814, filed Aug. 26, 2004, which is hereby incorporated by reference herein in its entirety.

In a third approach, users of user equipment devices inside and outside a home can use their media guidance application to communicate directly with media content source 416 to access media content. Specifically, within a home, users of user television equipment 404 and user computer equipment 406 may access the media guidance application to navigate among and locate desirable media content. Users may also access the media guidance application outside of the home using wireless user communications devices 406 to navigate among and locate desirable media content.

It will be appreciated that while the discussion of media content has focused on video content, the principles of media guidance can be applied to other types of media content, such as music, images, etc.

In some embodiments, an interactive media guidance application or widget can interface with external components to modify a user's viewing environment. For example, many home entertainment systems include a multitude of components such as a television, DVD player, and surround sound system. Collectively, these can provide a movie theatre-like environment in the home. The user may prefer to set attributes of these components that depend on the media content that is being played. For example, when watching a movie, the user may prefer that the surround sound system be set with high bass, compared to when watching news broadcasts.

Figure 5:
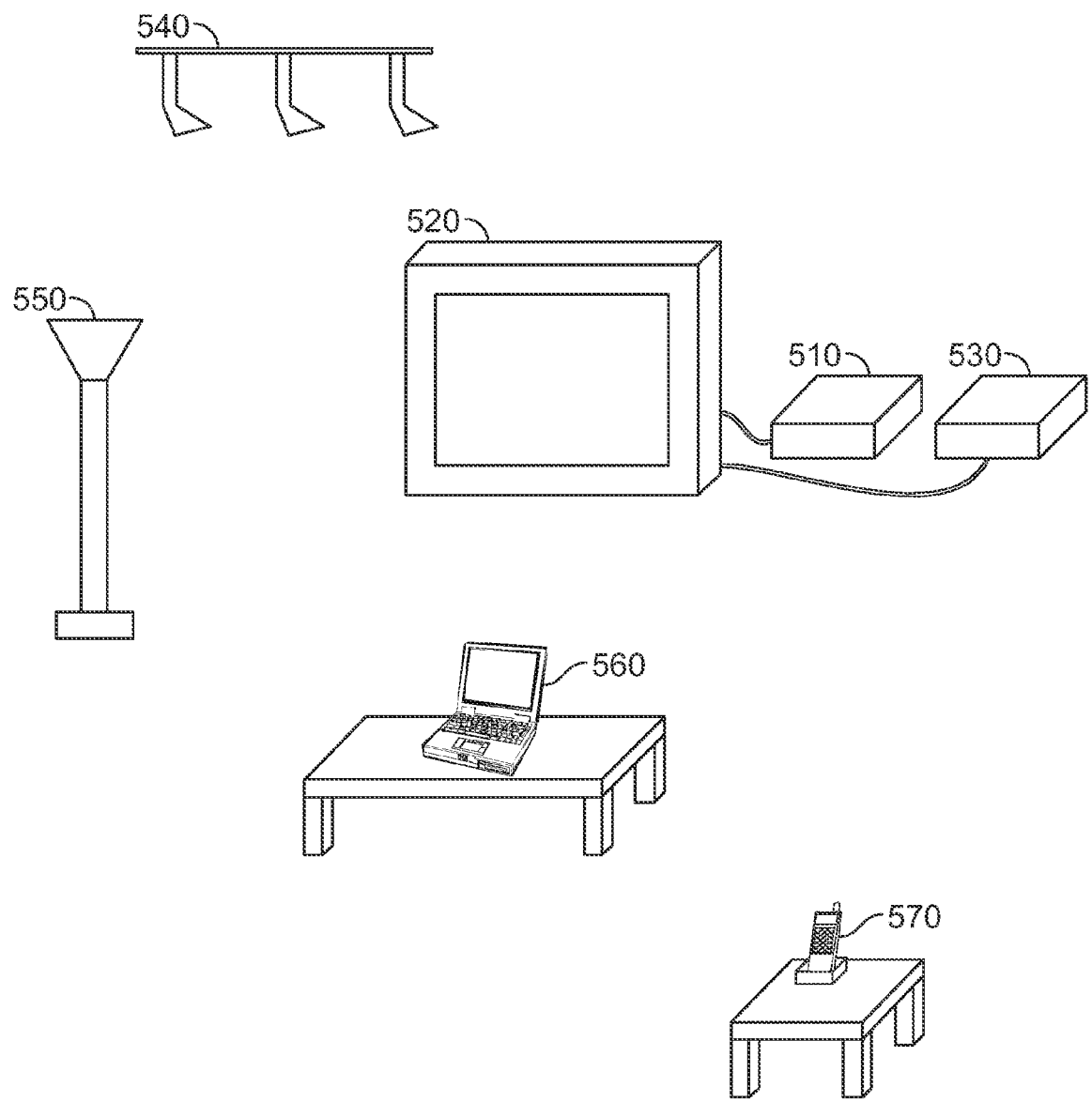
FIG. 5 illustrates an example of a system including at least one of a user equipment device, an external component, computer equipment and personal user device, in accordance with some embodiments of the present invention.

FIG. 5 illustrates examples of the elements of system 400 of FIG. 4 in an embodiment. The interactive media guidance application or widget may be implemented in a user television equipment 520, a user equipment device 510, user computer equipment 560, or any other suitable equipment. In an embodiment, component 424 may be an appliance, including a set of track lights 540, or a lamp 550 as show in FIG. 5. As an appliance, component 424 may also be a refrigerator, doorbell, ceiling fan, air conditioning unit, electric window blinds, dishwasher, laundry machine, or any other suitable appliance. In each case, an attribute of the appliance may be set to modify the viewing environment. Examples of such attributes include a brightness of the track lights, a brightness of the lamp, volume of the doorbell, position of the electric window blinds, and settings of the refrigerator and laundry machine.

In an embodiment, the component 424 may be user television equipment 402, user computer equipment 404 or a wireless communications device 406. As described previously, an external component is external to a user equipment device running a media guidance application or widget, and affects the viewing environment of a user through the physical senses of the user. For example, the component may be a television 520, media player 530, portable laptop computer 560, or a telephone 570. Examples of attributes include volume of the portable laptop computer speakers, brightness of the portable laptop display and volume of the telephone ringer. In an embodiment, component 424 may be an online social media service (e.g., Twitter, Facebook, Yahoo 360, Youtube, Orkut, Hi5, Friendster, LinkedIn, MySpace, etc.) or hardware, software or a remote server equipment hosting an online social media service. Attributes of the online social media service may include updates to the home page of the online social media service assigned to the user. Further details of the online social media services are reserved for discussion of FIG. 13.

Figure 6:
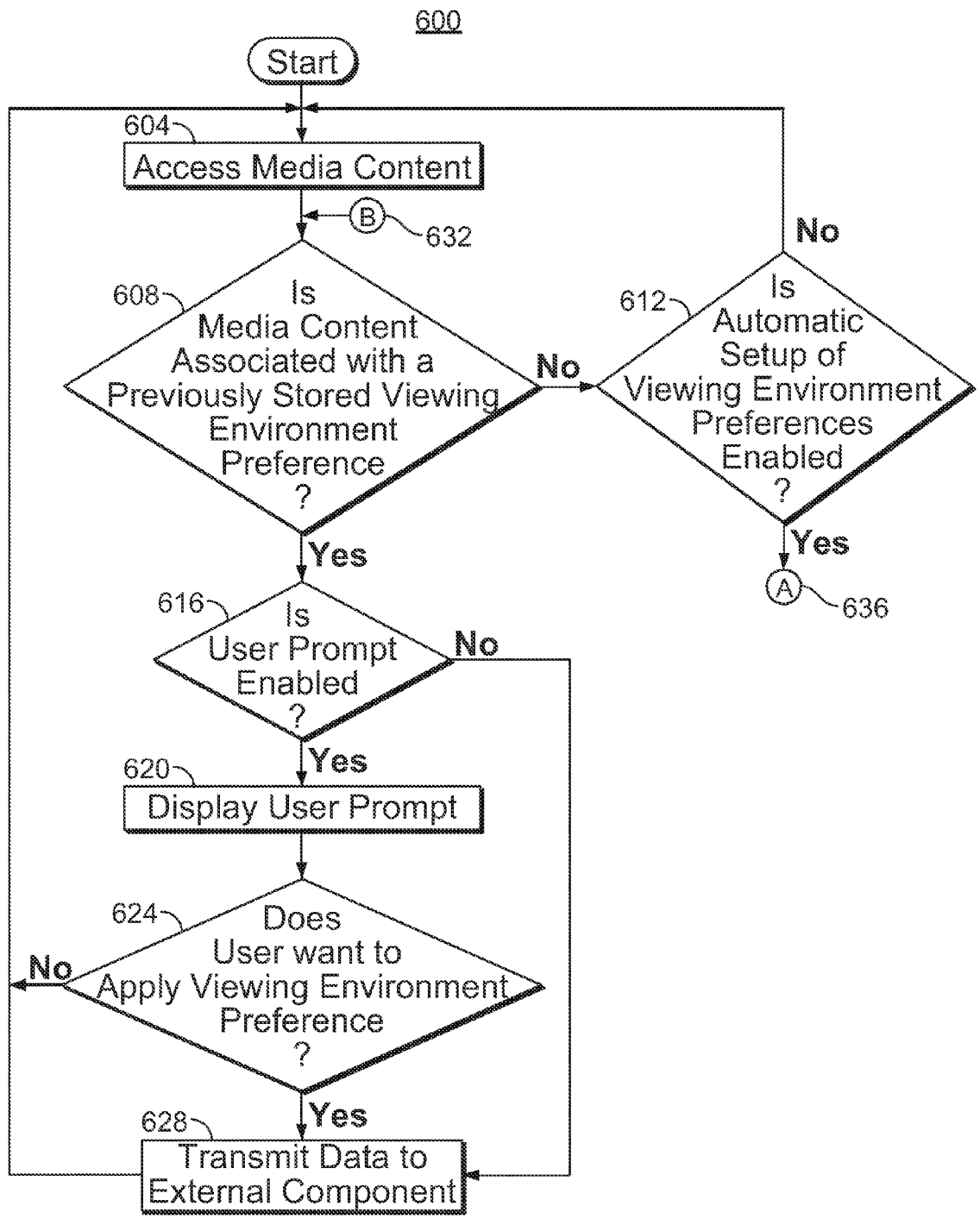
FIG. 6 illustrates a flowchart of steps in an embodiment of the present invention that describe the customization of viewing environments in an interactive media guidance application or widget.

FIG. 6 is a flowchart of steps of process 600 that describe the customization of viewing environments in an interactive media guidance application or widget. At step 604, a media content may be accessed by the interactive media guidance application or widget. For example, processing circuitry 306 may access media content by sending a command through I/O path 302 across communications network 414 to media content source 416. In response to sending the command, processing circuitry 306 may receive a media content from the media content source 416. In some embodiments, processing circuitry 306 may access media content in response to receiving input from user input interface 310. For example, processing circuitry 306 may show the grid listing of FIG. 1 on display 312 and receive an input from user input interface 310 indicating selection of a program entry shown on the display screen. Each media content may have corresponding media guidance data. For example, media content may be stored on media content source 416 and corresponding media guidance data may be stored on media guidance data source 418 of FIG. 4. In an embodiment, processing circuitry 306 may receive media guidance data from source 418 of FIG. 4.

In step 608, the interactive media guidance application or widget determines whether the accessed media content is associated to a previously stored viewing environment preference. In an embodiment, processing circuitry 306 makes the determination by comparing the media guidance data of the accessed media content with the media content associations of the previously stored viewing environment preference. For example, a viewing environment preference may be associated with category: sports, and media format: high definition. If the accessed media content is a high definition sports broadcast, then processing circuitry 306 determines that the accessed media content is associated to the viewing environment preference. Consequently, the process proceeds to step 616, otherwise it proceeds to process 612.

In step 616, a determination may be made whether a user prompt screen is enabled. Processing circuitry 306 may enable the user prompt screen in step 716 of the flowchart in FIG. 7. If processing circuitry 306 determines that the user prompt screen is enabled, process 600 may next proceed to step 620, otherwise it may proceed to step 628.

In step 620, a user prompt screen may be displayed to the user. The user prompt screen may request user confirmation to apply a viewing environment preference in response to determining that an accessed media content is associated with the viewing environment preference. For example, processing circuitry 306 may show on display 312 a user prompt screen (e.g., FIG. 8) to the user in response to determining that an accessed media content is associated to a viewing environment preference. Processing circuitry 306 may receive an input from user input interface 310 indicating that the viewing environment preference should be applied. For example, when processing circuitry 306 accesses a sports broadcast, it may show a prompt on display 312 to the user indicating that a stored viewing preference associated with category: sports exists. The display screen prompts the user to confirm modifying the viewing environment according to the stored viewing environment preference.

In step 624, a determination is made whether the user decides to the apply the previously stored viewing environment preference that is associated to the accessed media content. For example, processing circuitry 306 may determine based on receiving input from user input interface 310 that the user has decided to apply the previously stored viewing environment preference. If the determination is made to apply the viewing environment preference, the process proceeds to step 628, otherwise the process restarts.

In step 628, data is transmitted to at least one external component of the viewing environment preference to modify an attribute of the component according to the viewing environment preference. Data structure 1400 of FIG. 14 may store information about components and attributes of components. For example, a first component may be represented by a first segment of elements between 1452 and 1460, and a second component may be represented by a second segment of elements following element 1460. For example, processing circuitry 306 may transmit a command to I/O path 302 through communications network 414 to external component 424. For example, processing circuitry 306 may transmit commands to telephone 570 to turn off the ringer. The commands may include data parameters to set adjustable levels such as volume of the ringer. The transmitted data may be a data packet containing information describing the components and attributes of the components as described by the elements between 1452 and 1460 in data structure 1400.

Figure 7:
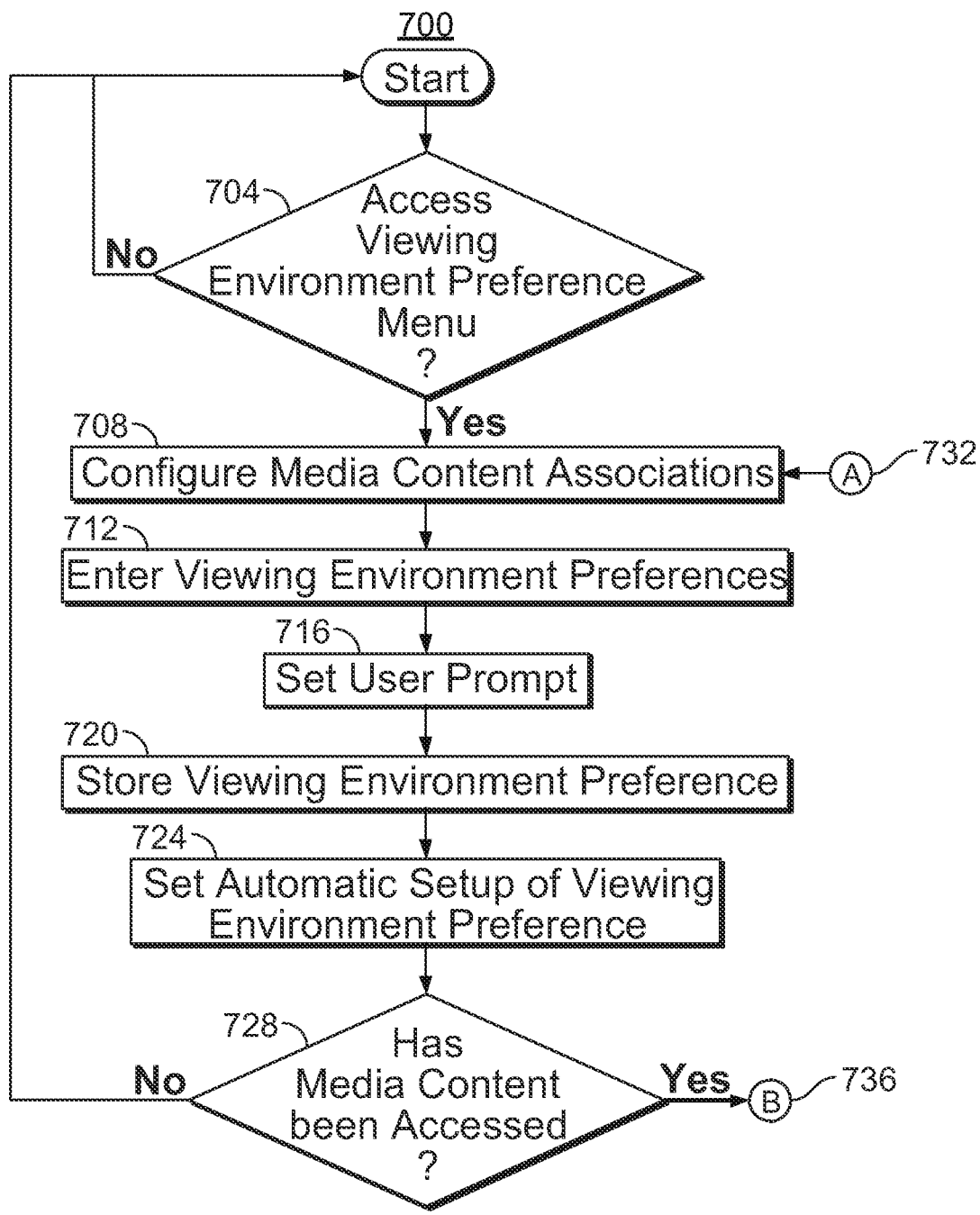
FIG. 7 illustrates a flowchart of steps in an embodiment of the present invention that describe the setting and storing of viewing environment preferences.

In an embodiment as described in FIG. 7 in reference to process 700, the interactive media guidance application or widget may automatically generate viewing environment preferences and media content associations. Step 612, 632 and 636 are examples of steps in an embodiment that enables automatic generation of viewing environment preferences. For example, referring back to step 608, if processing circuitry 306 determines that the accessed media content is not associated with a previously stored viewing environment preference, then the process 600 may proceed to step 612. In step 612, processing circuitry 306 may determine whether automatic generation of viewing environment preferences is enabled. The automatic generation may be enabled in step 724 of process 700 of FIG. 7. If automatic generation of viewing environment preferences is not enabled, process 600 may restart. Otherwise, process 600 may proceed through step 636 to step 708 of process 700 of FIG. 7. Subsequently, processing circuitry 306 may proceed through steps 708, 712, 716, 720, 724 and 728 of process 700 to navigate a user through display screens of menus (e.g., FIG. 9, 10, 11, 12) to configure media content associations and viewing environment preferences. In an embodiment, a determination may be made in step 728, after viewing environment preferences and media content associations have been configured and stored, whether a media content has been accessed and whether the automatic generation is enabled. For example, if processing circuitry 306 determines that a media content has been accessed and that automatic generation is enabled, then it may return to process 600 through step 736 and 632 to step 608 in FIG. 6.

FIG. 7 is a flowchart of steps for a process 700 of setting viewing environment preferences and media content associations in an embodiment of the invention. In this process, media content associations and viewing environment preferences may be configured and stored in a user profile corresponding to an interactive media guidance application or widget.

In step 704, the interactive media guidance application or widget determines whether to access a viewing environment preference menu. For example, processing circuitry 306 may determine whether to access a viewing environment preference menu in response to receiving input from a user input interface 310, such as a remote control or soft menu option shown on display 312. Processing circuitry 306 may show to the user on display 312, a menu of options (e.g., FIG. 9), to modify an existing viewing environment preference, or to create a new viewing environment preference.

In step 708, a display screen including a menu of options to configure media content associations may be shown to the user. For example, processing circuitry 306 may show to the user, on display 312, a menu of options (e.g., FIG. 10) to configure media content associations. In an embodiment, media content may be associated to a viewing environment preference by media guidance data, user profile data, any other suitable data, or any combination thereof. An example of a media content may be the movie, Avatar: The Last Airbender. An example of a stored viewing environment preference may be lights: off and phone: ringer silenced. A media content association of the viewing environment preference may be the media guidance data consisting of genre: fantasy and category: movie. When processing circuitry 306 receives an input from user input interface 310 to access Avatar: The Last Airbender, it may determine that a media content of category: movie and genre: fantasy has been accessed. Next, processing circuitry 306 may determine that the stored viewing environment preference is associated to the category: movie and genre: fantasy. The processing circuitry 306 may transmit commands by I/O path 302 through communication network 414 to external components 424.

In some embodiments, in step 708, the options may include suggested viewing environment preferences from friends or other users. When operating with a first user profile, processing circuitry 306 may access a second user profile and stored viewing environment preferences associated with the second user profile, and make suggestions of stored viewing environment preferences associated with the second user profile, to the user of the first user profile. The second user profile may be selected by processing circuitry 306 based upon close similarities between the first and second user profile, or may be selected based on user input received from user input interface 310 indicating a suggestion of a viewing environment preference from a user of the second user profile, to a user the first user profile.

In step 712, viewing environment preferences may be entered after configuring the media content associations in step 708. For example, processing circuitry 306 may show on display 312 a menu of options (e.g., FIG. 11) to the user to configure viewing environment preferences. The display screen may list a set of components and attributes that are used to modify the viewing environment. In some embodiments, viewing environment preferences may be determined automatically by processing circuitry 306 based upon comparisons of a first user profile to a second user profile. In some embodiments, viewing environment preferences may be determined by processing circuitry 306 based upon user input received from user input interface 310 from a user of a second user profile, to a user of a first user profile.

In step 716, a user prompt screen may be enabled or disabled. For example, processing circuitry 306 may show display 312 a display screen (e.g., FIG. 9) including a menu item to enable to the user to enable or disable the user prompt screen. In response to receiving an input from user input interface 310 indicating enabling of the user prompt screen, processing circuitry 306 may store a setting to storage 308 indicating that a user prompt screen is enabled. Alternatively, in response to receiving an input from user input interface 310 indicating disabling of the user prompt screen, processing circuitry 306 may store a setting to storage 308 indicating that a user prompt screen is disabled.

In step 720, the configured viewing environment preference and media content associations may be stored. For example, in response to receiving an input from user input interface 310, processing circuitry 306 may store the viewing environment preference and media content associations in storage 308 of user equipment device 300. The input may be a button press on a remote control or a selection of a soft key from a menu in a display screen. In some embodiments, the stored viewing environment preference may be associated with a user profile for use with a specific user, or may be stored for global usage among all users of the interactive media guidance application or widget.

In step 724, the user may enable an option to automatically generate viewing environment preferences and media content associations. Processing circuitry 306 may show, in a display screen (e.g., FIG. 9) on display 312, a menu option to enable or disable automatic generation of viewing environment preferences and media content associations. In response to receiving input from user input interface 310, processing circuitry 306 may enable an option to automatically generate viewing environment preferences and media content associations. The automatic configuration may be described by a stimulus and a generation. The stimulus may be a trigger for automatic generation of viewing environment preferences and media content associations. Generation is the process of generating the viewing environment process and media content associations.

In some embodiments, determination that an accessed media content is not associated to a previously stored viewing environment preference may be a stimulus. For example, in response to accessing a media content that is not associated to a stored viewing environment preference, processing circuitry 306 may show on display 312 a prompt to the user to create a new viewing environment preference, or to modify a media content association of a stored viewing environment preference so that the accessed media content may be associated with the stored viewing environment preference. In some embodiments, the stimulus may not be a specific event, but a periodic occurrence. For example, processing circuitry 306 may monitor how a user configures media content associations, and generate new viewing environment preferences and media content associations at the end of every week, based on the monitored configurations.

In some embodiments, the generation may be based on user input received in response to a series of menu displays. For example, processing circuitry 306 may proceed through steps 708, 712, 716, 720, 724 and 728 of process 700 of FIG. 7. Processing circuitry 306 may navigate a user through displays screens 900, 1000, 1100, and 1200 and receive input from user input interface 310 to generate a viewing environment preference. In some embodiments, the generation may be based on monitored configuration data. For example, processing circuitry 306 may monitor how the user configures media content associations and how the user selects components and configures attributes of viewing environment preferences. Using this information, processing circuitry 306 may generate a new viewing environment preference and configure media content associations of the new viewing environment preference. In some embodiments, the generation of viewing environment preferences and media content associations may be based on previously stored viewing environment preferences. For example, processing circuitry 306 may automatically modify existing viewing environment preferences. For example, two different viewing environment preferences having different media content associations may exist. A first viewing environment preference specifies lights: turned off and phones: ringers silenced. The first viewing environment preference may be associated to category: movie, and genre: fantasy. A second viewing environment preference specifies electric window blinds: closed, and the doorbell: ringer off. The second viewing environment preference may be associated with the category: movie, and the genre: action. Processing circuitry 306 may determine that the first and second viewing environment preferences share a common media content association, the category: movie, and modify each preference to be identical. Alternatively, processing circuitry 306 may merge the two viewing environment preferences into a single viewing environment preference.

In some embodiments, the interactive media guidance application or widget may determine how to automatically generate the viewing environment based on time of day. For example, if processing circuitry 306 determines that the user tends to turn off the phone at night, but not during the day, it may create a viewing environment preference that specifies phones: ringer off and time: after 6 PM. In some embodiments, processing circuitry 306 may receive information from an external component 424 that enables the interactive media guidance application or widget to learn viewing environment preferences of the user. The information may be communicated across communications network 414 between external components 424 and user equipment device 300 running the interactive media guidance application or widget. For example, when processing circuitry 306 receives an input from user input interface 310 to access a media content of category: movie, it may also receive data from external components 424 indicating that the user has turned off the lights and closed the electric blinds. After a number of repetitions of this behavior, processing circuitry 306 may show to the user on display 312, a suggested viewing environment preference of lights: off and electric blinds: closed, associated to category: movie.

In step 728, the interactive media guide application may determine whether a media content has been accessed before the configuration of media content associations and viewing environment preferences. For example, processing circuitry 306 may determine whether a media content has been accessed before configuring media content associations in step 708. This step may be used in an embodiment where automatic setup of viewing environment preferences is enabled, and will be discussed in reference to FIG. 6.

Figure 8:
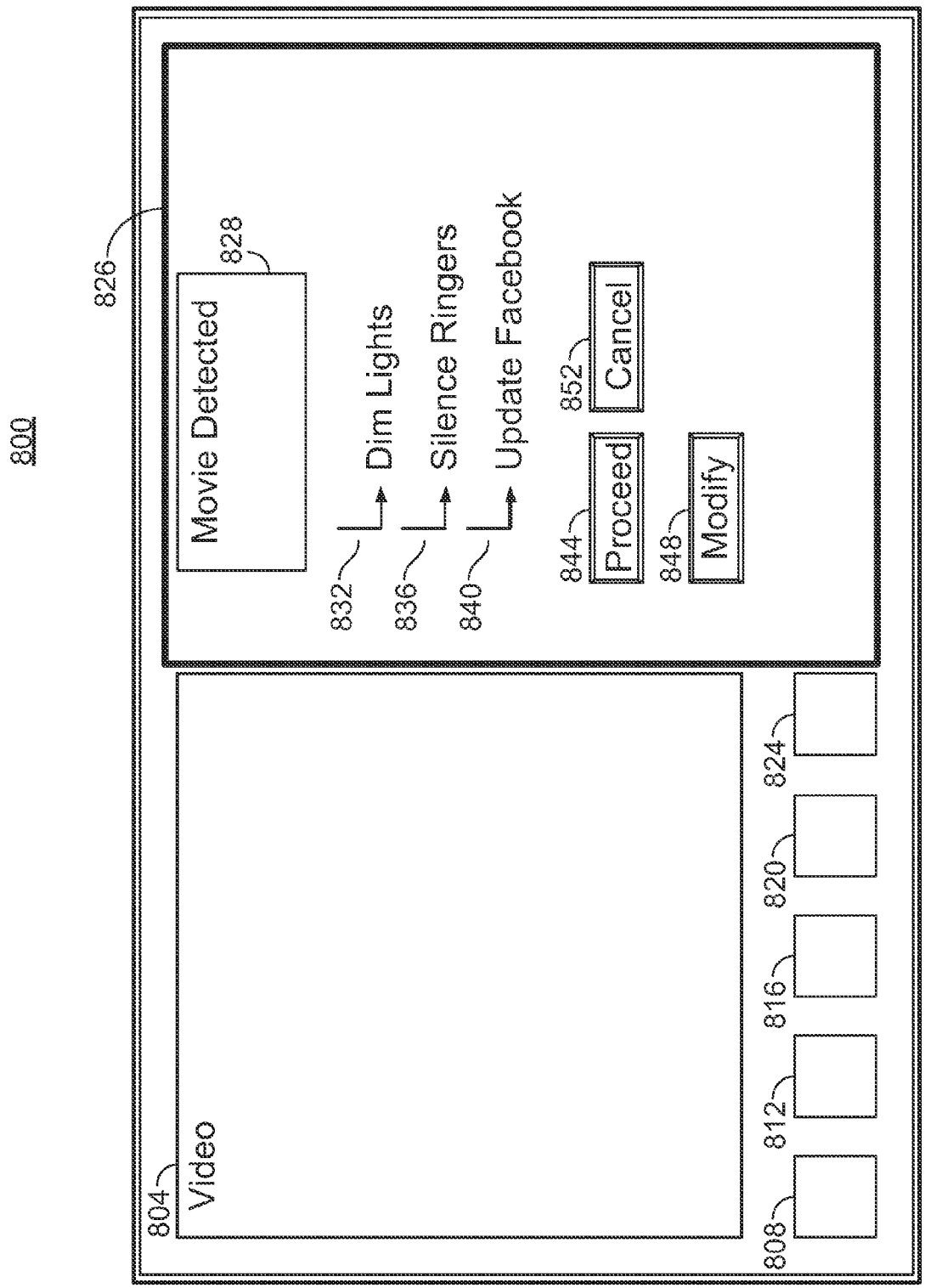
FIG. 8 illustrates an example of a display screen in an interactive media guidance application or widget in accordance with some embodiments of the present invention.

FIG. 8 illustrates a display screen that may be shown to a user in response to determining that an accessed media content is associated to a previously stored viewing environment preference. Processing circuitry 306 may receive a user selection of highlighted entry 110 from user input interface 310. In response to the user input, processing circuitry 306 may access the media content from media content source 416, access corresponding media guidance data from media guidance data source 418, retrieve a user profile from storage 308, and retrieve a previously stored viewing environment preference from storage 308. In some embodiments, processing circuitry 306 may determine whether the accessed media content is associated to a previously stored viewing environment preference by comparing media content associations of the previously stored viewing environment preference and the accessed media guidance data, retrieved user profile or a combination thereof. In response to determining that the accessed media content is associated to the previously stored viewing environment preference, processing circuitry 306 may display the accessed media content to region 804, and elements of the previously stored viewing environment preference in overlay region 826. Processing circuitry may display element 828, which may be an identifier of the viewing environment preference, a media content association of the viewing environment preference, the accessed media guidance data corresponding to the accessed media content, the retrieved user profile, or any combination thereof. Processing circuitry 306 may display elements 832, 836 and 840 to indicate components and attributes of the viewing environment preference to the user. For example, element 832 may show that the brightness attribute of component lights are dimmed in the viewing environment preference. Similarly, element 836 may show that attribute ringer volume of component phone is silenced, and element 840 may show that an update message attribute should be sent to component online social media service facebook.

In some embodiments, an accessed media content may be associated to multiple stored viewing environment preferences. The media content may be stored in media content source 416, and associations may be stored as media guidance data in media guidance data source 418. For example, the movie: Jerry Maguire, may be associated to type: movie, and genre: drama and actor: Tom Cruise. In an embodiment, there may exist two viewing environment preferences that have identical media content associations. For example, a first viewing environment preference and second viewing environment preference may have media content associations of type: movie and genre: sports. In some embodiments there may exist two viewing environment preferences that have overlapping but not identical media content associations. For example, a first viewing environment preference may have media content associations of type: movie and genre: sports, and a second viewing environment preference may have media content associations of type: movie and actor: Tom Cruise.

In these embodiments, processing circuitry 306 may determine that the accessed media content is associated to a plurality of viewing environment preference. Consequently, in some embodiments, processing circuitry 306 may display each of the plurality of viewing environment preferences in separate overlay regions. In some embodiments, processing circuitry may display element 828 as a scrollable menu, pull-down menu, or any other suitable menu to select among the plurality of viewing environment preferences.

After showing display screen 800 to the user of the interactive media guidance application or widget, several inputs may be received from the user. Elements 844, 848 and 852 may indicate examples of such inputs. In some embodiments, processing circuitry 306 may display element 844 as a "proceed" button to the user. In response to receiving a user selection of the proceed button 844 from user input interface 310, processing circuitry 306 may transmit data to external component 424 to modify an attribute of the component in accordance with the viewing environment preference. The receiving input from user and transmitting data to external components may correspond to steps 724 and 728 of process 700 of FIG. 7. Data structure 1400 of FIG. 14 may store information about components and attributes of components. For example, a first component may be represented by a first segment of elements between 1452 and 1460, and a second component may be represented by a second segment of elements following element 1460. For example, processing circuitry 306 may receive a user selection of proceed button 844 and in response transmit data to lights 540 and 550 to dim, to phone 570 to silence ringer volume, and to a remote server equipment hosting the online social media service facebook to post a status update. The transmitted data may be a data packet containing information describing the components and attributes of the components as described by the elements between 1452 and 1460 in data structure 1400.

In some embodiments, processing circuitry 306 may display element 852 as a "cancel" button to the user. In response to receiving a user selection of cancel button 844 from user input interface 310, processing circuitry 306 may clear overlay region 826 of elements of viewing environment preferences. The receiving of the cancel button selection and clearing overlay region may correspond to step 724 and the restart of the process 700 of FIG. 7.

In some embodiments, processing circuitry 306 may display element 848 as a "modify" button to the user. In response to receiving a user selection of the modify button 848 from user input interface 310, processing circuitry 306 may enable a user to modify attributes and components of the viewing environment preference. For example, processing circuitry 306 may receive a user selection of modify button 848 and in response direct the user to the display screens of one of FIG. 9, 10, 11, or 12. Details of those display screens shall be reserved for later.

In another example, processing circuitry 306 may receive a user selection of modify button 848 and in response enable the user to individually select and toggle elements 832, 836 and 840. Subsequent to receiving inputs indicating selections of elements 832, 836 and 840, processing circuitry 306 may receive a user selection of the proceed button 844. In response to receiving the user selection of proceed button 844, processing circuitry 306 will transmit data to modify attributes of the components corresponding to the selections of elements. For example, if processing circuitry only receives a user selection of dim lights element 832, processing circuitry 306 may only transmit data to component lights to dim brightness, but not to component phone or remote server equipment hosting facebook. Alternatively, if processing circuitry only receives a user selection of dim lights element 832, processing circuitry 306 may transmit data to all components, but the data will only direct component lights to dim brightness.

In some embodiments, display elements 808, 812, 816, 820 and 824 may be used as buttons to navigate to other displays related to configuration of viewing environment preferences, or any other displays related to the interactive media guidance application or widget. For example, in response to receiving selection of one of buttons 808, 812, 816, 820 and 824 from user input interface 310, processing circuitry 306 may redirect the user to a different menu by showing on display 312 one of the displays shown in FIG. 8, 9, 10, 11, or 12.

Figure 9:
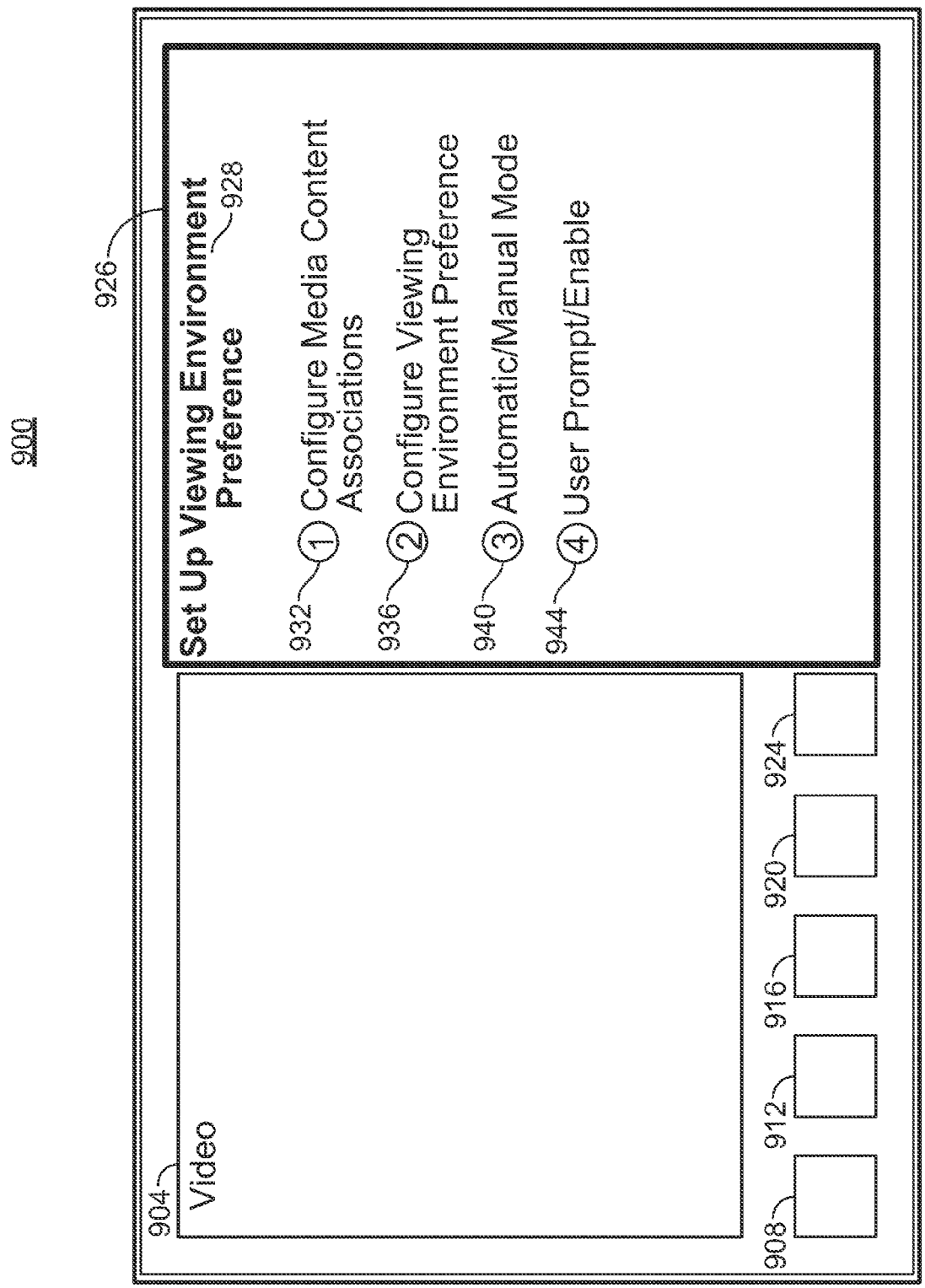
FIG. 9 illustrates an example of a display screen in an interactive media guidance application or widget in accordance with some embodiments of the present invention that may be shown to a user to enable the user to modify a viewing environment preference.

FIG. 9 illustrates a display screen 900 that may be displayed to the user to set up a viewing environment preference. Display 900 may be shown, corresponding to step 504 of process 500 of FIG. 5. Processing circuitry 306 may navigate the user to display screen 900 in response to input received from a user input interface 310. For example, the input may be received from a remote control, or a user selection of button 812, 912, or modify button 848 in a display screen of the interactive media guidance application or widget. Processing circuitry 306 may display an accessed media content in a region 904 and elements of a setup menu in overlay region 926.

Processing circuitry 306 may display elements 932, 936, 940 and 944 as menu items to direct the user to set up viewing environment preferences. In some embodiments, processing circuitry 306 may display menu item 932 to direct users to configure media content associations. For example, in response to receiving a selection of menu item 932 from user input interface 310, processing circuitry 306 may direct the user to display screen 1000 of FIG. 10. In some embodiments, processing circuitry 306 may display menu item 936 to direct users to configure viewing environment preferences. For example, in response to receiving a selection of menu item 936 from user input interface 310, processing circuitry 306 may direct the user to display screen 1100 of FIG. 11. In some embodiments, processing circuitry 306 may display menu item 940 to allow a user to select between an automatic mode or manual mode for generation of viewing environment preferences, as described in reference to FIG. 5 and FIG. 7. In some embodiments, processing circuitry 306 may display menu item 944 to allow a user to enable a user prompt screen to confirm the use of an associated viewing environment preference, as described in reference to FIGS. 5, 6 and 8.

In some embodiments, display elements 908, 912, 916, 920 and 924 may be used as buttons to navigate to other displays related to configuration of viewing environment preferences, or any other displays related to the interactive media guidance application or widget. For example, in response to receiving selection of one of buttons 908, 912, 916, 920 and 924 from user input interface 310, processing circuitry 306 may redirect the user to a different menu by showing on display 312 one of the displays shown in FIG. 8, 9, 10, 11, or 12.

Figure 10:
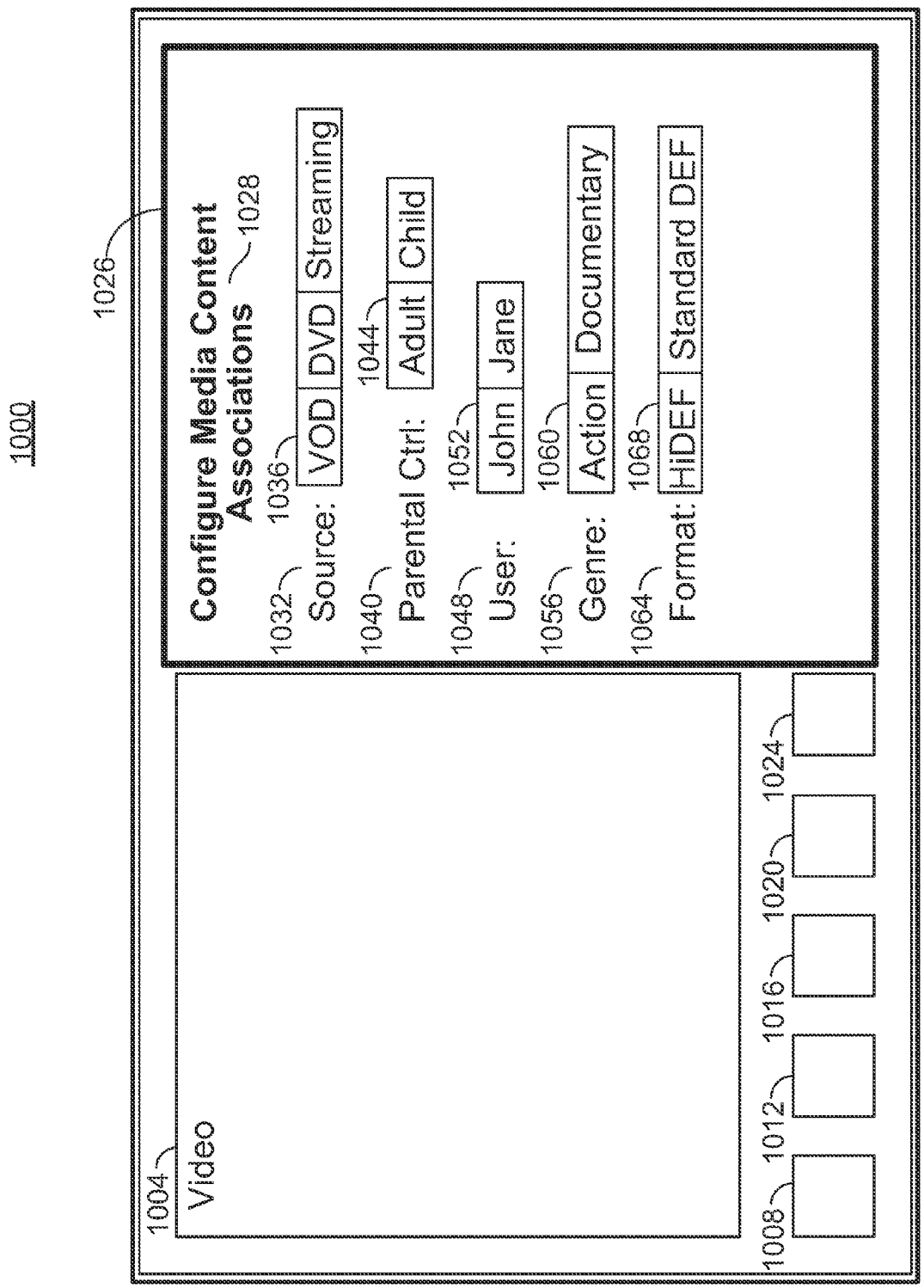
FIG. 10 illustrates an example of a display screen in an interactive media guidance application or widget in accordance with some embodiments of the present invention that may be shown to a user to configure media content associations.

FIG. 10 illustrates a display 1000 that may be displayed to a user to configure media content associations. Display 1000 may be shown, corresponding to step 508 of process 500 of FIG. 5. Processing circuitry 306 may navigate the user to display screen 1000 in response to input received from a user input interface 310. For example, the input may be received from a remote control, or a user selection of button 932 in a display screen of the interactive media guidance application or widget. Processing circuitry 306 may display an accessed media content in a region 1004 and elements of a setup menu in overlay region 1026.

Processing circuitry 306 may display elements 1032, 1036, 1040, 1044, 1048, 1052, 1056, 1060, 1064 and 1068 as menu items to direct the user to configure media content associations to a viewing environment preference. For example, in response to receiving a selection of menu item 816, 916, 1016, or 932 from user input interface 310, processing circuitry 306 may direct the user to display screen 1000 of FIG. 10. In some embodiments, processing circuitry 306 may display menu items corresponding to media guidance data, user profile information, or any combination thereof to configure media content associations. For example, processing circuitry 306 may display two columns in overlay region 1026. A left column displays examples of media guidance data, and a right column displays types of the examples of media guidance data.

As an example, processing circuitry 306 may display source menu item 1032 to enable the user to select a type of media content source listed in menu item 1036. In response to receiving a user selection of VOD, processing circuitry 306 sets a media content association of source type: VOD with the viewing environment preference. Only accessed media content having source type: VOD may be associated to the viewing environment preference.

As an example, processing circuitry 306 may display parental control menu item 1040 to enable the user to select a type of parental control listed in menu item 1044. In response to receiving a user selection of adult, processing circuitry 306 sets a parental control type: adult with the viewing environment preference. Only accessed media content having parental control rating: adult may be associated to the viewing environment preference.

As an example, processing circuitry 306 may display user profile menu item 1048 to enable the user to select a user profile listed in menu item 1052. In response to receiving a user selection of John's profile, processing circuitry 306 sets John's profile with the viewing environment preference. Only media content accessed along while using John's profile may be associated to the viewing environment preference.

For example, if processing circuitry 306 accesses a media content while Jane (e.g., a first user) is logged into the interactive program guidance application, then the accessed media content is not associated to the viewing environment preference. In contrast, if processing circuitry 306 accesses a media content while John (e.g., a second user) is logged into the interactive program guidance application, then the accessed media content is associated to the viewing environment preference.

As an example, processing circuitry 306 may display user profile menu item 1056 to enable the user to select a genre listed in menu item 1060. In response to receiving a user selection of the action genre, processing circuitry 306 sets genre: action with the viewing environment preference. Only accessed media content having the genre: action may be associated to the viewing environment preference.

As an example, processing circuitry 306 may display user profile menu item 1064 to enable the user to select a genre listed in menu item 1068. In response to receiving a user selection of the Hi-definition format, processing circuitry 306 sets format: Hi-definition with the viewing environment preference. Only accessed media content having the format: Hi-definition may be associated to the viewing environment preference.

In some embodiments, display elements 1008, 1012, 1016, 1020 and 1024 may be used as buttons to navigate to other displays related to configuration of viewing environment preferences, or any other displays related to the interactive media guidance application or widget. For example, in response to receiving selection of one of buttons 1008, 1012, 1016, 1020 and 1024 from user input interface 310, processing circuitry 306 may redirect the user to a different menu by showing on display 312 one of the displays shown in FIG. 8, 9, 10, 11, or 12.

Figure 11:
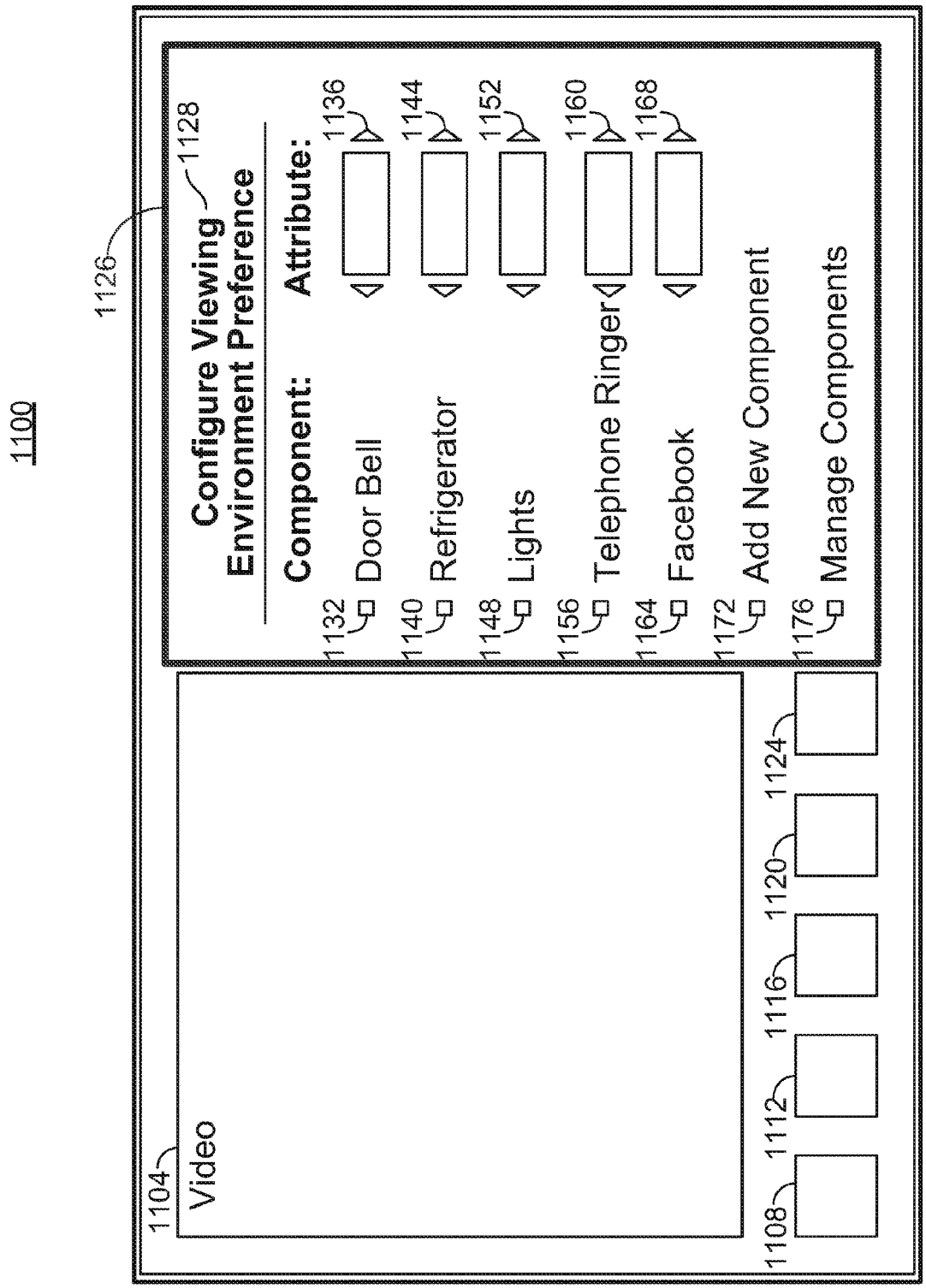
FIG. 11-12 illustrate example display screens in an interactive media guidance application or widget in accordance with some embodiments of the present invention that may be shown to a user to configure attributes of external components that are modified in accordance with a viewing environment preference.

FIG. 11 illustrates a display screen 1100 that may be displayed to a user to set up a viewing environment preference. Display 1100 may be shown, corresponding to step 512 of process 500 of FIG. 5. Processing circuitry 306 may navigate the user to display screen 1100 in response to input received from a user input interface 310. For example, the input may be received from a remote control, or a user selection of button 936 in a display screen of the interactive media guidance application or widget. Processing circuitry 306 may display an accessed media content in a region 1104 and elements of a setup menu in overlay region 1126.

Processing circuitry 306 may display elements 1132, 1136, 1140, 1144, 1148, 1152, 1156, 1160, 1164, 1168, 1172 and 1176 as menu items to direct the user to set up viewing environment preferences. For example, in response to receiving a selection of menu item 820, 920, 1020, or 936 from user input interface 310, processing circuitry 306 may direct the user to display screen 1100 of FIG. 11. In some embodiments, processing circuitry 306 may display menu items corresponding to components and attributes to configure viewing environment preferences. For example, processing circuitry 306 may display two columns in overlay region 1126. A left column displays examples of components (e.g., door bell 1132, lights 1148, etc.), and a right column displays options (e.g., 1136, 1152, etc.) to modify attributes of the components. In some embodiments, the options may refer to attributes as types of properties (e.g., volume, brightness, etc.), or attributes as settings of the properties (e.g., decibels, lumens, etc.).

As an example, processing circuitry 306 may display menu item 1132 to enable the user to select an option 1136 to modify an attribute of the component door bell. In some embodiments, the attribute may be types of properties (e.g., volume, ringtone, etc.). In some embodiments, the attribute may be a value of a property (e.g., volume level in decibels, name of ringtone, etc.). For example, processing circuitry 306 may receive a user selection of medium volume level for option 1136. In response, processing circuitry 306 may set the volume attribute to medium level for component door bell.

As an example, processing circuitry 306 may display menu item 1140 to enable the user to select an option 1144 to modify an attribute of the component refrigerator. In some embodiments, the attribute may be settings of the refrigerator (high cool, medium cool, low cool, etc.), which may affect the volume of noise output by the refrigerator. For example, processing circuitry 306 may receive a user selection of low cool for option 1144 to reduce noise output of the refrigerator. In response, processing circuitry 306 may set the attribute low cool for component refrigerator.

As an example, processing circuitry 306 may display menu item 1148 to enable the user to select an option 1152 to modify an attribute of the component lights. In some embodiments, the attribute may be a level of brightness. For example, processing circuitry 306 may receive a user selection of low brightness for option 1152. In response, processing circuitry 306 may set the brightness attribute to low level for component lights.

As an example, processing circuitry 306 may display menu item 1156 to enable the user to select an option 1160 to modify an attribute of the component telephone ringer. In some embodiments, the attribute may be types of properties (e.g., volume, ringtone, etc.). In some embodiments, the attribute may be a value of a property (e.g., volume level in decibels, name of ringtone, etc.). For example, processing circuitry 306 may receive a user selection of medium volume level for option 1160. In response, processing circuitry 306 may set the volume attribute to medium level for component telephone ringer.

As an example, processing circuitry 306 may display menu item 1164 to enable the user to select an option 1168 to modify an attribute of the component online social media service facebook. In some embodiments, the attribute may be status update messages. For example, processing circuitry 306 may receive a user selection of status update for option 1160. In response, processing circuitry 306 may set a status update template message for the component facebook. The status update template message may include user information, media guidance data, or any other suitable information. For example, processing circuitry 306 may send a status update message using a template that includes a time, and title of a media content being accessed by the user.

In some embodiments, processing circuitry 306 may display element 1172 as a button to enable the user to add new components. In response to receiving a user selection of the button 1172 from user input interface 310, processing circuitry 306 may initiate a wireless scan by I/O path 302 to detect surrounding external component 424 such as a blue tooth enabled device or equipment. Processing circuitry 306 may add the detected device or equipment may to a list of components displayed in overlay region 1126 of display screen 1100. After adding the detected external component to the list, processing circuitry 306 may receive an input from user input interface 310 indicating selection of an option to modify an attribute of the added external component.

In some embodiments, processing circuitry 306 may display element 1176 as a button to enable the user to manage components of the viewing environment preference. In response to receiving a user selection of the button 1176 from user input interface 310, processing circuitry 306 may enable the user to modify settings of each component, or selectively remove or add components. Processing circuitry 306 may display additional submenus in the current display screen, or an overlay display, or a new display screen. For example, processing circuitry 306 may display the display 1200 of FIG. 12.

In some embodiments, display elements 1108, 1112, 1116, 1120 and 1124 may be used as buttons to navigate to other displays related to configuration of viewing environment preferences, or any other displays related to the interactive media guidance application or widget. For example, in response to receiving selection of one of buttons 1108, 1112, 1116, 1120 and 1124 from user input interface 310, processing circuitry 306 may redirect the user to a different menu by showing on display 312 one of the displays shown in FIG. 8, 9, 10, 11, or 12.

Figure 12:
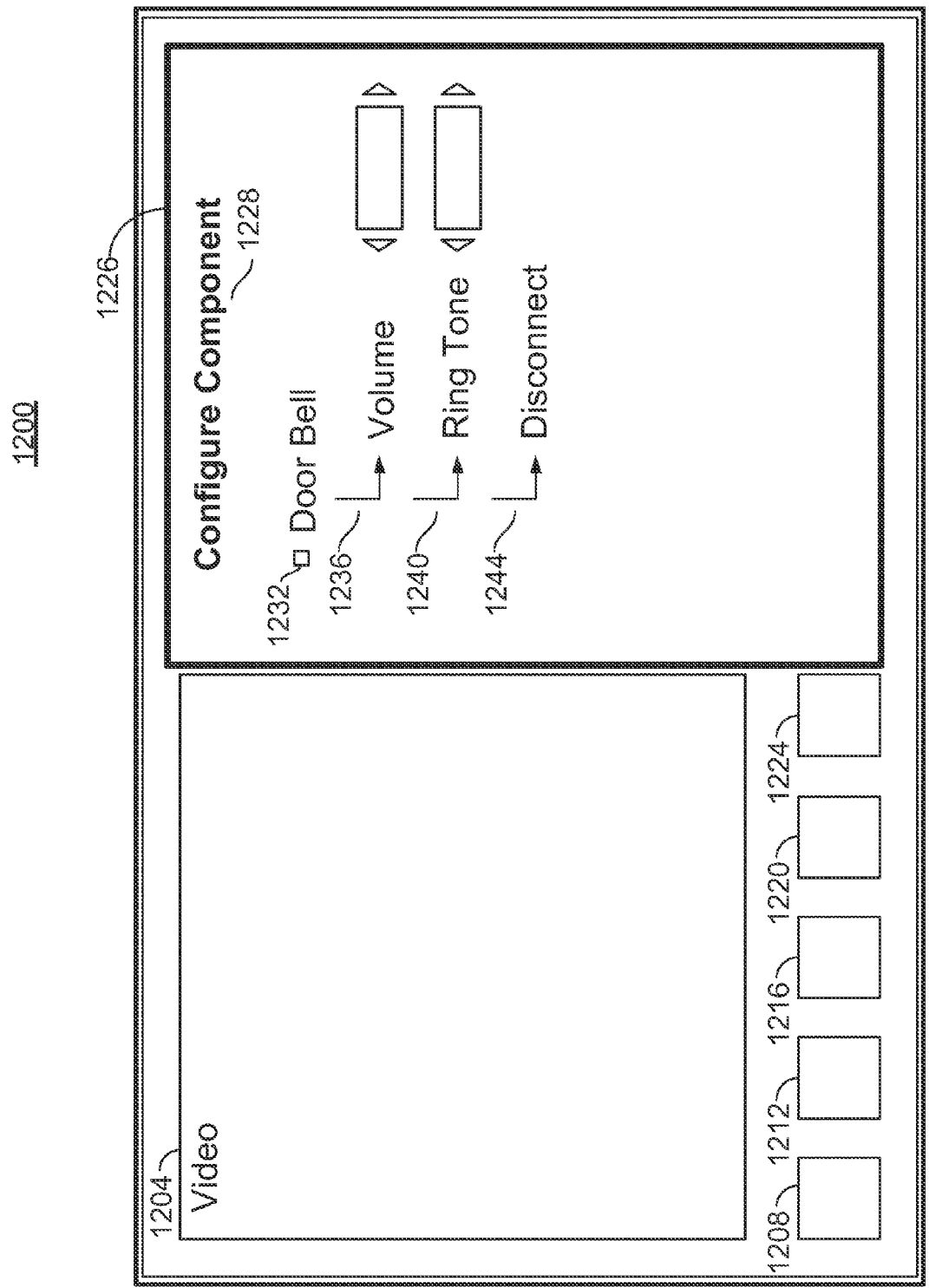

FIG. 12 illustrates a display 1200 that may be displayed to the user to configure a component and attribute of a viewing environment preference. Display 1200 may be shown, corresponding to step 512 of process 500 of FIG. 5. Processing circuitry 306 may navigate the user to display screen 1200 in response to input received from a user input interface 310. For example, the input may be received from a remote control, or a user selection of button 824, 924, 1024, 1124, or 1224 in a display screen of the interactive media guidance application or widget. For example, the input may be received from a user selection of menu items 1132, 1136, 1140, 1144, 1148, 1152, 1156, 1160, 1164, or 1168 in overlay region 1126 of FIG. 11. Processing circuitry 306 may display an accessed media content in a region 1204 and elements of a setup menu in overlay region 1226.

Processing circuitry 306 may display elements 1232, 1236, and 1240 as menu items to direct the user to set up viewing environment preferences. In some embodiments, processing circuitry 306 may display submenu items of attributes corresponding to components. For example, processing circuitry 306 may display a submenu item 1236 to adjust the volume attribute corresponding to doorbell component 1232. Processing circuitry 306 may receive an input from a user input interface 310 indicating selection of submenu 1236, and further receive a setting for attribute volume. Processing circuitry 306 will then set the volume attribute of component door bell.

For example, processing circuitry 306 may display a submenu item 1240 to change the ringtone attribute corresponding to door bell component 1232. Processing circuitry 306 may receive an input from a user input interface 310 indicating selection of submenu 1240, and further receive a selection of a ringtone. Processing circuitry 306 will then set the ringtone attribute of component door bell.

In some embodiments, processing circuitry 306 may display a submenu item 1244 to disconnect an external component. Processing circuitry 306 may receive a selection of menu item 1244 from user input interface 310 indicating that a user wants to disconnect external component door bell, and does not want to modify attributes of the door bell as part of the viewing environment preference.

In some embodiments, display elements 1208, 1212, 1216, 1220 and 1224 may be used as buttons to navigate to other displays related to configuration of viewing environment preferences, or any other displays related to the interactive media guidance application or widget. For example, in response to receiving selection of one of buttons 1208, 1212, 1216, 1220 and 1224 from user input interface 310, processing circuitry 306 may redirect the user to a different menu by showing on display 312 one of the displays shown in FIG. 8, 9, 10, 11, or 12.

Figure 13:
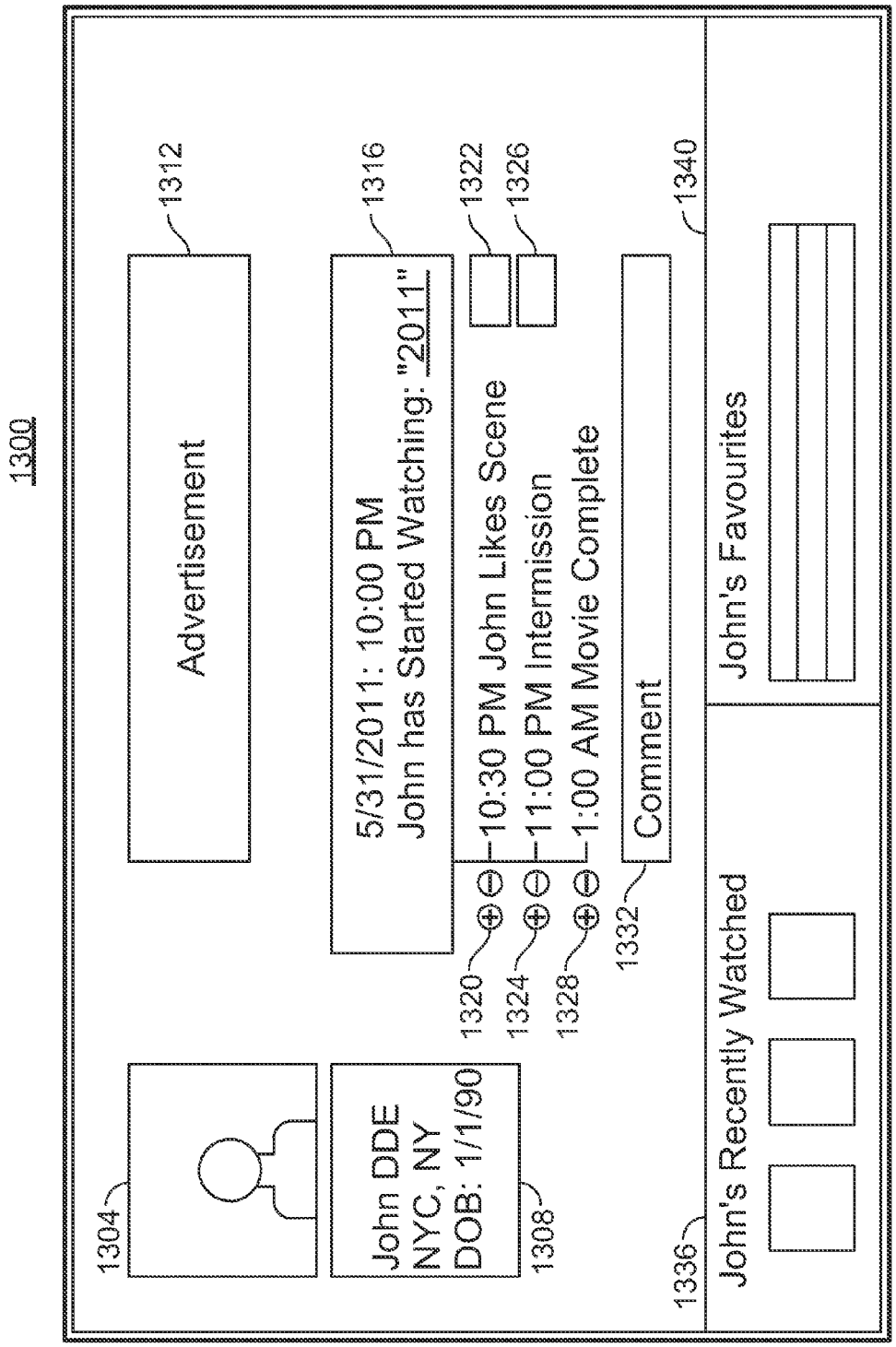
FIG. 13 illustrates an example of a display screen in an interactive media guidance application or widget in accordance with some embodiments of the present invention.

FIG. 13 illustrates a display screen 1300 that may illustrate an online social media service website. Online social media services allow users to share information and experiences with friends. Examples of such services include Facebook, Twitter, Orkut, Hi5, Yahoo 360! and Myspace. Display screen 1300 may illustrate a user home page or profile page for a typical online social media service.

An external component 424 such a remote server equipment may host the online social media service. In some embodiments, the remote server equipment 424 generate web pages, and transmit the generated web pages across communications network 414 to client equipment such as user computer 404, wireless user communications device 406 and user television equipment 408. For example, remote server equipment 424 may generate a web page displaying a photo, avatar, or any other suitable identifier of the user in display element 1304. For example, remote server equipment 424 may generate a web page displaying personal information of the user in display element 1308. For example, remote server equipment 424 may generate a web page displaying an advertisement 1312.

In some embodiments, a remote server equipment 424 may transmit information across communications network 414 to client equipment to generate the web pages on the client equipment. In some embodiments, a remote server equipment 424 may in part generate the web page, and transmit the partially generated web page to the client equipment, which may complete the generation of the web page.

In some embodiments, a user may update his information associated with the online social media service, as part of a viewing environment preference. For example, in response to determining that an accessed media content is associated to a viewing environment preference, processing circuitry 306 may transmit data across I/O path 302 to external component 424, such as a remote server equipment hosting the online service. The data may be status update information, a message, or any suitable information for describing a change in the viewing environment or media content viewing of the user. Remote server equipment 424 may receive the transmitted data, generate a status message based in part on the transmitted data, and post the status message to a home page or profile page of the user.

Element 1316 may show an illustrative status message in response to determining that an accessed media content is associated to a viewing environment preference. For example, processing circuitry 306 may receive an input from user input interface 310 indicating a selection of the movie 2012 by a user John. In response to receiving this input, processing circuitry 306 may determine that the movie 2012 accessed by user John is associated a previously stored viewing environment preference. Subsequently, according to the viewing environment preference, processing circuitry 306 may transmit status update information through a communications network 414, such as an internet connection, to a remote server equipment 424 that is hosting the online social media service. In response to receiving the status update information, the remote media server may update the home page of the user to display element 1316, showing the message: "John has started watching '2012'" with a date and time stamp.

In an embodiment, as processing circuitry 306 continues to access the media content, processing circuitry 306 may continue to transmit data to remote server equipment hosting the online social media service. Processing circuitry 306 may transmit status update information to the online social media service automatically or manually in response to user input.

Processing circuitry 306 may receive an input from user input interface 310 indicating that a scene is favored, and in response, transmit status update information to the remote server equipment 424. In response to receiving the status update information, remote server equipment 424 may update, based on the received status update information, a home page of a user to display element 1320 with message: "John Likes Scene." Remote server equipment 424 may also update the home page to display element 1322 next to the message, providing a link to a preview of the favored scene.

Processing circuitry 306 may, in response to accessing media content or media guidance data, automatically send status update information to the remote server equipment 424. For example, in response to accessing media guidance data indicating an intermission such as an advertisement, processing circuitry 306 may transmit a status update information to remote server equipment 424. In response to receiving the status update information, remote server equipment 424 may update, based on the received status update information, a home page of a user to display element 1324 indicating an intermission. Remote server equipment 424 may also update the home page to display element 1326 linking to an advertisement playing during the intermission.

For example, in response to accessing media guidance data indicating an intermission such as an advertisement, processing circuitry 306 may transmit a status update information to remote server equipment 424. In response to receiving the status update information, remote server equipment 424 may update, based on the received status update information, a home page of a user to display element 1328 indicating an completion of the movie.

Users of the social media website may indicate a positive or negative rating for update elements of a home page. For example, remote server equipment 424 may update a home page to display the '+' or '−' rating icons next to each of update elements 1320, 1324 and 1328. In response to receiving an input indicating a user selection of one of the rating icons, remote server equipment 424 may increment or decrement a stored rating value corresponding to one of the update elements 1320, 1324 and 1328.

Users may also comment on status updates using entry element 1332. Remote server equipment 424 may include the entry element as part of a user home page. In response to receiving user comment input transmitted from a client device into the entry element 1332, remote server equipment may update the user home page to include the received user comment input.

Display screen 1100 may include a subsection 1336 that describes recently watched media content by a user. For example, remote server equipment 424 may generate a list of recently watched media content by a user, and modify a user home page to display icons corresponding to selections of the generated list. The selections may be randomly chosen, or chosen by rank. For example, subsection 1336 may show three randomly chosen media content selections from all media content selections accessed in the previous week. For example, subsection 1336 may show the top three ranked media content selections from all media content selections accessed in the previous week.

Display screen 1100 may include a subsection 1340 that lists favorite media content of a user. For example, remote server equipment 424 may generate a ranked list of all previously accessed media content by a user, and modify a user home page to display selections from the ranked list. For example, subsection 1340 may list only the top three ranked media content items that have been accessed by a user.

FIG. 14 illustrates a data structure for storing a viewing environment preference in accordance with some embodiments of the invention. Sub-elements of the viewing environment preference data structure may be communicated from the user equipment and external components of the viewing environment. For example, the data structure includes a section for a media content association 1420, a section for general settings 1440, and a section for components 1450. Media content association section 1420 may contain a section for media guidance data 1420, and a section for user profile data 1430. For example, media guidance data section 1420 may contain a title field and genre field for the action movie named Terminator 3. For example, the user profile data section 1430 may contain a name field for a user John and a field for an access interval start and stop time of 7 PM and 8 PM. General settings section 1440 may contain additional settings such as whether a user prompt is enabled, or whether automatic generation of viewing environment preferences is enabled.

The section for components 1450 may contain subsections corresponding to each external component. For example, section 1452 and section 1460 corresponding to a first component corresponding to a doorbell, and to a second component corresponding to a blinds. Each component section may include an index field indicating the component (e.g., element 1452), an address of the component (e.g., element 1453), a component name, and a set of data fields for attributes. For example, there may be a first component with index 1, named doorbell, with a component address of 00:FF:00:11:22:33. In some embodiments, an attribute may have several fields, including an attribute index, attribute name, attribute metric, and attribute value. The attribute index may be a unique identifier for the attribute. The attribute name may be a plain text identifier of the component. The attribute metric may be a quantitative measure of the attribute. The attribute value may be a setting for the attribute. For example, the component doorbell of 1452 may have two attributes indicated by the names volume, and ringtone. A first attribute volume may have a value setting of 10 decibels. In some embodiments, an attribute may not be quantifiable and thus may not have an attribute metric. For example, a second attribute ringtone may have an attribute value corresponding to a file name File1.wav of a ringtone of the doorbell.

As an example, a second component and corresponding set of attributes may be indicated by elements 1460 and 1470. As illustrated in FIG. 14, element 1460 describes a component named Electric Blinds, which has an index 2, an address 00:FF:00:11:22:44. The Electric Blinds component has an attribute of index 1 with an attribute named status, and setting value of closed. The component may be Electric Blinds that are set to close.

In order to modify a setting of a viewing environment in accordance with a stored viewing environment preference, processing circuitry 306 may load data structure 1400 from storage 308. Processing circuitry 306 may then generate and transmit a data packet containing the elements corresponding to a single component to the address of the component. For example, the data packet may contain the elements between 1452 and 1460. An address 1453 may be a MAC address or any other suitable identifier that is used to identify an external component 424 on communications network 414 using a communications protocol. Examples of communications protocols have been discussed in the description of FIG. 4 and may include USB, 802.11, 802.3, Bluetooth, or any other suitable protocol.

It will be understood that the foregoing is only illustrative of the principles of the invention, and that various modifications may be made by those skilled in the art without departing from the scope and spirit of the invention. It will also be understood that various display, selection and sorting techniques may be made available to the user and examples used herein are only for convenience. Those skilled in the art will appreciate that the invention may be practiced by other than the described embodiments, which are presented for purposes of illustration rather than of limitation, and the invention is limited only by the claims that follow.

What is claimed is:

1. A method for customizing viewing environment preferences in an interactive media guidance application, the method comprising:
accessing, with a user equipment device, media content using an interactive media guidance application;
determining whether the accessed media content is associated with a previously stored viewing environment preference; and
in response to determining that the media content is associated with the previously stored viewing environment preference, transmitting data to a remote server to modify an attribute of the remote server corresponding to a first user based on the previously stored viewing environment preference, wherein the remote server makes the modified attribute available to a second user.

2. The method of claim 1 wherein the interactive media guidance application comprises a widget.

3. The method of claim 1 further comprising:
receiving input from the first user, comprising a viewing environment preference; and
storing the viewing environment preference in a user profile associated with the first user as a previously stored viewing environment preference.

4. The method of claim 1, wherein the transmitted data comprises status update information, a message, and media guidance data associated with the accessed media content.

5. The method of claim 1, wherein the transmitted data identifies the first user accessing the media content, and the remote server identifies a profile of the first user based on the transmitted data, updates the profile of the first user based on the transmitted data, and indicates to the second user, based on the transmitted data, that the first user is accessing the media content.

6. The method of claim 1 further comprising:
receiving an input from the first user, comprising an operation of the interactive media guidance application;
automatically generating a viewing environment preference based on the input from the first user; and
storing the viewing environment preference in a user profile associated with the first user as the previously stored viewing environment preference.

7. The method of claim 1, further comprising:
receiving rating information from an input at the user equipment, wherein transmitting the data to the remote server comprises transmitting the received rating input information.

8. The method of claim 1 further comprising:
in response to determining that the media content is associated with the previously stored viewing environment preference, prompting the first user for confirmation; and wherein the transmitting data to the remote server is done in response to receiving user input based on the confirmation.

9. The method of claim 1, wherein the accessed media content is associated with the previously stored viewing environment preference by media guidance data.

10. The method of claim 9, wherein the media guidance data comprises one or more of:
a media title, a genre, actor information, a parental control rating, a media format, and advertisement information.

11. A system for customizing viewing environments preferences in an interactive media guidance application, the system comprising:
processing circuitry configured to:
access media content using an interactive media guidance application;
determine whether the accessed media content is associated with a previously stored viewing environment preference; and
in response to determining that the media content is associated with the previously stored viewing environment preference, transmit data to a remote server to modify an attribute of the remote server corresponding to a first user based on the previously stored viewing environment preference, wherein the remote server makes the modified attribute available to a second user.

12. The system of claim 11 wherein the interactive media guidance application comprises a widget.

13. The system of claim 11 wherein the processing circuitry is further configured to:
receive input from the first user, comprising a viewing environment preference; and
store the viewing environment preference in a user profile associated with the first user as a previously stored viewing environment preference.

14. The system of claim 11, wherein the transmitted data comprises status update information, a message, and media guidance data associated with the accessed media content.

15. The system of claim 11, wherein the transmitted data identifies the first user accessing the media content, and the remote server identifies a profile of the first user based on the transmitted data, updates the profile of the first user based on the transmitted data, and indicates to the second user, based on the transmitted data, that the first user is accessing the media content.

16. The system of claim 11 wherein the processing circuitry is further configured to:
receive an input from the first user, comprising operations of the interactive media guidance application;
automatically generate a viewing environment preference based on the input from the first user; and
store the viewing environment preference in a user profile associated with the first user as the previously stored viewing environment preference.

17. The system of claim 11, wherein the processing circuitry is further configured to:
receive rating information from an input at a user equipment, wherein transmitting the data to the remote server comprises transmitting the received rating input information.

18. The system of claim 11 wherein the processing circuitry is further configured to:
in response to determining that the media content is associated with the previously stored viewing environment preference, prompt the first user for confirmation; and
wherein the transmitting data to the remote server is done in response to receiving user input based on the confirmation.

19. The system of claim 11, wherein the accessed media content is associated with the previously stored viewing environment preference by media guidance data.

20. The system of claim 19, wherein the media guidance data comprises one or more of:
a media title, a genre, actor information, a parental control rating, a media format, and advertisement information.

* * * * *